US010609581B2

(12) United States Patent
Lee et al.

(10) Patent No.: US 10,609,581 B2
(45) Date of Patent: Mar. 31, 2020

(54) METHOD AND APPARATUS FOR SETUP OF WIRELESS COMMUNICATION

(71) Applicant: Samsung Electronics Co., Ltd., Gyeonggi-do (KR)

(72) Inventors: Min-Gyu Lee, Gyeonggi-do (KR); Byung-Moo Lee, Seoul (KR); Mayuresh Madhukar Patil, Bangalore (IN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/614,117

(22) Filed: Jun. 5, 2017

(65) Prior Publication Data
US 2017/0353981 A1 Dec. 7, 2017

Related U.S. Application Data

(60) Provisional application No. 62/345,097, filed on Jun. 3, 2016.

(30) Foreign Application Priority Data

Apr. 25, 2017 (KR) ........................ 10-2017-0053144

(51) Int. Cl.
*H04W 76/10* (2018.01)
*H04W 24/08* (2009.01)
*H04W 8/00* (2009.01)
*H04W 72/08* (2009.01)
*H04W 48/12* (2009.01)
(Continued)

(52) U.S. Cl.
CPC ............. *H04W 24/08* (2013.01); *H04W 4/70* (2018.02); *H04W 8/005* (2013.01); *H04W 12/08* (2013.01); *H04W 48/12* (2013.01); *H04W 72/085* (2013.01); *H04W 76/10* (2018.02); *H04L 63/20* (2013.01); *H04W 88/04* (2013.01); *H04W 88/08* (2013.01)

(58) Field of Classification Search
CPC ....... H04W 4/70; H04W 8/005; H04W 12/08; H04W 24/08; H04W 48/12; H04W 72/085; H04W 76/10; H04W 88/04; H04W 88/08; H04L 63/20
See application file for complete search history.

(56) References Cited

U.S. PATENT DOCUMENTS

2013/0128894 A1* 5/2013 Shah ........................ H04W 8/10
370/401
2014/0204834 A1* 7/2014 Singh .................... H04W 40/22
370/315
(Continued)

FOREIGN PATENT DOCUMENTS

KR 101640452 7/2016

*Primary Examiner* — Michael Thier
*Assistant Examiner* — Brian P Cox
(74) *Attorney, Agent, or Firm* — The Farrell Law Firm, P.C.

(57) ABSTRACT

A method and a device for setup of wireless communication is provided. The method includes recognizing at least one terminal present in a same space as the device, sending a request for a connection between the device and an access point (AP) to the at least one terminal, receiving AP information necessary for connection to the AP from the at least one terminal corresponding to the request, and attempting to connect to the AP based on the AP information.

12 Claims, 26 Drawing Sheets

(51) Int. Cl.
  *H04W 12/08* (2009.01)
  *H04W 4/70* (2018.01)
  *H04W 88/08* (2009.01)
  *H04W 88/04* (2009.01)
  *H04L 29/06* (2006.01)

(56) References Cited

U.S. PATENT DOCUMENTS

| | | | |
|---|---|---|---|
| 2015/0024762 A1* | 1/2015 | Cho | H04W 24/02 |
| | | | 455/450 |
| 2015/0256563 A1 | 9/2015 | Le Guen et al. | |
| 2015/0319675 A1* | 11/2015 | Park | H04W 48/16 |
| | | | 370/338 |
| 2015/0358820 A1 | 12/2015 | Li et al. | |
| 2016/0127996 A1 | 5/2016 | Patil et al. | |
| 2016/0286398 A1* | 9/2016 | Abraham | H04L 63/065 |
| 2017/0208531 A1* | 7/2017 | Huang | H04W 28/021 |
| 2018/0288611 A1* | 10/2018 | Amin | H04W 12/10 |
| 2018/0335514 A1* | 11/2018 | Dees | G01S 7/36 |

* cited by examiner

| SECURITY TYPE | SECURITY INFORMATION |
|---|---|
| 1901 — 0 (OPTION 1) | PUBLIC KEY — 1911 |
| 1902 — 1 (OPTION 2) | NONE — 1912 |
| 1903 — 2 (OPTION 3) | SOFT AP INFORMATION (SSID, OPERATING CHANNEL, PIN) — 1913 |
| 1904 — 3 (OPTION 4) | DDP SECURITY INFORMATION (E.G., IDENTITY KEY, SUPPORTED SECURITY MECHANISM) — 1914 |

FIG.19

| ATTRIBUTE TYPE | ATTRIBUTE TYPE |
|---|---|
| 2021 — WLAN ATTRIBUTE (0) | SSID — 2031 |
| 2022 — SETTING KEY (1) | KEY INFORMATION — 2032 |
| 2023 — PASSWORD (2) | PASSPHRASE — 2033 |
| 2024 — MAC ADDRESS OF AP (3) | MAC ADDRESS — 2034 |

FIG.20

METHOD AND APPARATUS FOR SETUP OF WIRELESS COMMUNICATION

PRIORITY

This application claims priority under 35 U.S.C. § 119(e) to a U.S. Provisional Patent Application filed in the United States Patent and Trademark Office on Jun. 3, 2016 and assigned Ser. No. 62/345,097, and under 35 U.S.C. § 119(a) to a Korean Patent Application filed in the Korean Intellectual Property Office on Apr. 25, 2017, and assigned Ser. No. 10-2017-0053144, the entire contents of each of which are incorporated herein by reference.

BACKGROUND

1. Field of the Disclosure

The present disclosure relates generally to a method and an apparatus for connecting a device to the Internet based on wireless connection, and more particularly, to a method and an apparatus for connecting a device to an access point (AP) based on a neighborhood area network (NAN).

2. Description of the Related Art

The Internet is evolving from the human-centered connection network by which humans create and consume information to the Internet of Things (IoT) network by which information is communicated and processed between things or other distributed components. The Internet of Everything (IoE) technology may be an example of a combination of the Big data processing technology and the IoT technology through, e.g., a connection with a cloud server.

To implement the IoT, technology elements, such as a sensing technology, wired/wireless communication and network infrastructure, service interface technology, and a security technology are required. There is recent ongoing research concerning inter-object connection technologies, such as a sensor network, machine-to-machine (M2M), and machine-type communication (MTC).

The IoT environment may offer intelligent Internet technology (IT) services that collect and analyze data generated by things connected to each another to add value to life. The IoT may have various applications, such as a smart home, a smart building, a smart city, a smart or connected car, a smart grid, health-care, smart appliances, and state-of-the-art medical services through the conversion or integration of existing IT technologies and various industries.

IoT devices concern electronic devices that transmit and receive data in real-time through the Internet, such as refrigerators, air conditioners, TVs, lights, washers, or cleaners that are capable of Internet communication. IoT devices may perform wireless communication through the Internet. When wireless-fidelity (Wi-Fi) is used for wireless communication, an IoT device must connect to an AP to conduct wireless communication. In this case, the operation of establishing a connection between the IoT device and the AP is called Wi-Fi setup.

FIG. 1 is an illustration of a method for connecting an IoT device to an AP.

Referring to FIG. 1, an IoT device 100 and an AP 200 may initiate a connection through various connection operations. For example, the IoT device 100 and the AP 200 may be connected via quick response (QR) code recognition 110 or an input 120 of pressing a button on an application in a mobile terminal 300, e.g., a smartphone or tablet personal computer (PC). The IoT device 100 and the AP 200 may also be connected through a near-field communication (NFC) contact 130 of the terminal 300, e.g., an NFC-capable smartphone or tablet PC, or a personal identification number (PIN) input 140 of the terminal 300, e.g., a remote controller.

As such, there may be various methods for connecting the IoT device 100 to the AP 200, depending on the manufacturer, the type of the IoT device, wireless techniques supported by the IoT device, such as QR code, NFC, or Bluetooth (BT)/Bluetooth low energy (BLE). Therefore, the addition of wireless techniques may result in cost increases, connection delays, or user confusion.

SUMMARY

An aspect of the present disclosure provides a method and an apparatus for supporting various communication schemes between a device and a terminal on a wireless connection.

Another aspect of the present disclosure provides a method and an apparatus for quickly and easily connecting a device to an AP based on the NAN.

Another aspect of the present disclosure provides a method and an apparatus for supporting an AP connection of a device by a terminal.

Another aspect of the present disclosure provides a method and an apparatus for recognizing whether a device and a terminal are present in the same space.

Another aspect of the present disclosure provides a method and an apparatus for receiving AP information by a device through a terminal that is present in the same space.

Another aspect of the present disclosure provides a method and an apparatus for connecting a device to an AP based on AP information received from a terminal.

Another aspect of the present disclosure provides a NAN-based method and apparatus for connecting a device to an AP which may reduce the amount of memory demanded.

Another aspect of the present disclosure provides a NAN-based method and apparatus for connecting a device to an AP which may reduce the time of connection between a device and an AP.

Another aspect of the present disclosure provides a method and an apparatus for connecting to an AP through support from a terminal connected to the AP when a device fails to connect to the AP.

In accordance with an aspect of the present disclosure, a method for setup of wireless communication of a device is provided. The method includes recognizing at least one terminal present in a same space as the device, sending a request for a connection between the device and an AP to the at least one terminal, receiving AP information necessary for connection to the AP from the at least one terminal corresponding to the request, and attempting to connect to the AP based on the AP information.

In accordance with another aspect of the present disclosure, a method for setup of wireless communication of a device is provided. The method includes receiving a request for a connection between a device and an AP from the device and sending AP information necessary for connection to the AP to the device corresponding to the request.

In accordance with another aspect of the present disclosure, a device for setup of wireless communication is provided. The device includes a controller configured to recognize at least one terminal present in a same space as the device and a transceiver configured to send a request for a connection between the device and an AP to the at least one terminal and receive AP information necessary for connection to the AP from the at least one terminal, wherein the controller is further configured to attempt to connect to the AP based on the AP information.

In accordance with another aspect of the present disclosure, a terminal for setup of wireless communication is provided. The terminal includes a transceiver configured to receive a request for a connection between a device and an AP from the device and send AP information necessary for connection to the AP to the device corresponding to the request.

BRIEF DESCRIPTION OF THE DRAWINGS

The foregoing and other aspects, features, and advantages of the present disclosure will be more apparent from the following detailed description, taken in conjunction with the accompanying drawings, in which:

FIG. 19 is a table of security information for a security scheme between an IoT device and a terminal according to an embodiment of the present disclosure;

FIG. 20 is a table of configuration data for a security scheme between an IoT device and a terminal according to an embodiment of the present disclosure;

DETAILED DESCRIPTION OF EMBODIMENT OF THE PRESENT DISCLOSURE

Figure 1:
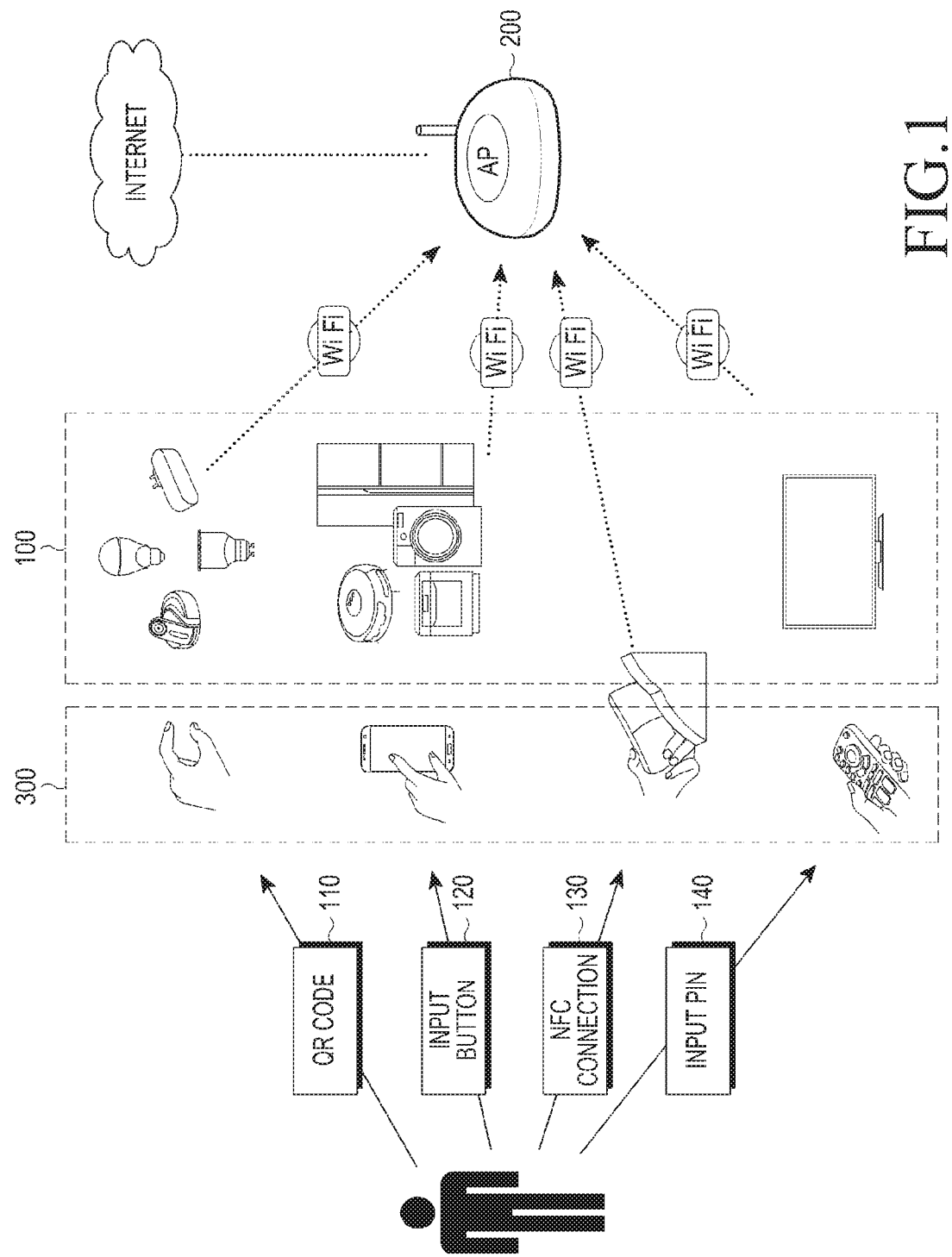
FIG. 1 is an illustration of a method for connecting an IoT device to an AP.

Hereinafter, embodiments of the present disclosure are described in detail with reference to the accompanying drawings.

In describing the embodiments of the present disclosure, the description of a technology that is known in the art and is not directly related to the present disclosure is omitted. This is for further clarifying the present disclosure without obfuscating the present disclosure.

Some elements may be exaggerated or schematically shown. The size of an element does not necessarily reflect the actual size of the element. The same reference numeral is used to refer to the same element throughout the accompanying drawings.

Advantages and features of the present disclosure, and methods for achieving the same may be understood through the embodiments described below taken in conjunction with the accompanying drawings. However, the present disclosure is not limited to the embodiments disclosed herein, and various changes may be made thereto. The embodiments disclosed herein are provided only to inform one of ordinary skilled in the art of the category of the present disclosure. The present disclosure is defined only by the appended claims and their equivalents. The same reference numeral denotes the same element throughout the present disclosure.

It should be appreciated that the blocks in each flowchart and combinations of the flowcharts may be performed by computer program instructions. Since the computer program instructions may be loaded in a processor of a general purpose computer, a custom computer or other programmable data processing devices, the instructions executed through a processor of a computer or other programmable data processing devices generate means for performing the functions described in connection with a block(s) of each flowchart. Since the computer program instructions may be stored in a non-transitory computer-available or computer-readable memory that may be oriented to a computer or other programmable data processing devices to implement a function in a certain manner, the instructions stored in the computer-available or non-transitory computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a certain logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" indicates a software element or a hardware element such as a field-programmable gate array (FPGA) or an application specific integrated circuit (ASIC). A unit plays a certain role. However, the term "unit" is not limited to indicating a software or a hardware element. A unit may be configured in a storage medium that may be addressed or may be configured to reproduce one or more processors. Accordingly, as an example, a unit includes elements, such as software elements, object-oriented software elements, class elements, task elements, processes, functions, attributes, procedures, subroutines, segments of program codes, drivers, firmware, microcodes, circuits, data, databases, data architectures, tables, arrays, and variables. A function provided in an element or a unit may be combined with additional elements or may be split into sub elements or sub units. Further, an element or a unit may be implemented to reproduce one or more central processing units (CPUs) in a device or a security multimedia card.

Although the description of embodiments herein focuses primarily on examples of orthogonal frequency division multiplexing (OFDM)-based wireless communication systems, the subject matter of the present disclosure may also be applicable to other communication systems or services having similar technical backgrounds without departing from the scope and spirit of the present disclosure.

Figure 2:
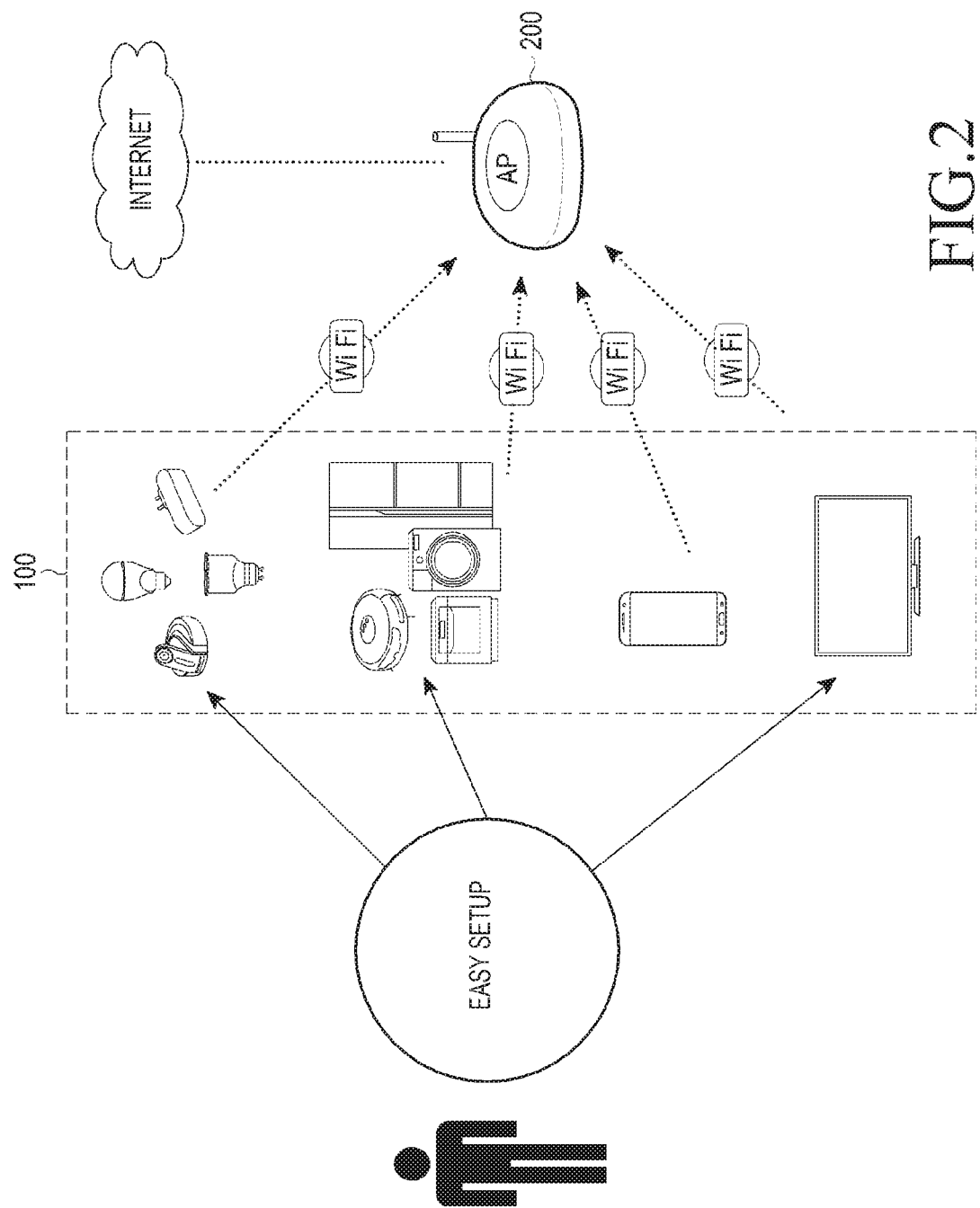
FIG. 2 is an illustration of a method for connecting an IoT device to an AP according to an embodiment of the present disclosure.

FIG. 2 is an illustration of a method for connecting an IoT device to an AP according to an embodiment of the present disclosure.

Referring to FIG. 2, an IoT device 100 may receive information about an AP 200 from a user terminal (also referred to as a user equipment, UE, or terminal) and connect to the AP 200 based on the received information about the AP 200. The Wi-Fi-based setup described below is denoted an easy setup scheme. The easy setup scheme allows for connection between the IoT device 100 and the AP 200 regardless of the manufacturer or type of the IoT device and terminal or wireless techniques supported, relieving user inconvenience. Further, the easy setup scheme eliminates the need for a user's involvement, guarding a user from any confusion.

Embodiments of the present disclosure for quickly and easily connecting the IoT device to the AP based on a NAN are described below.

Figure 3:
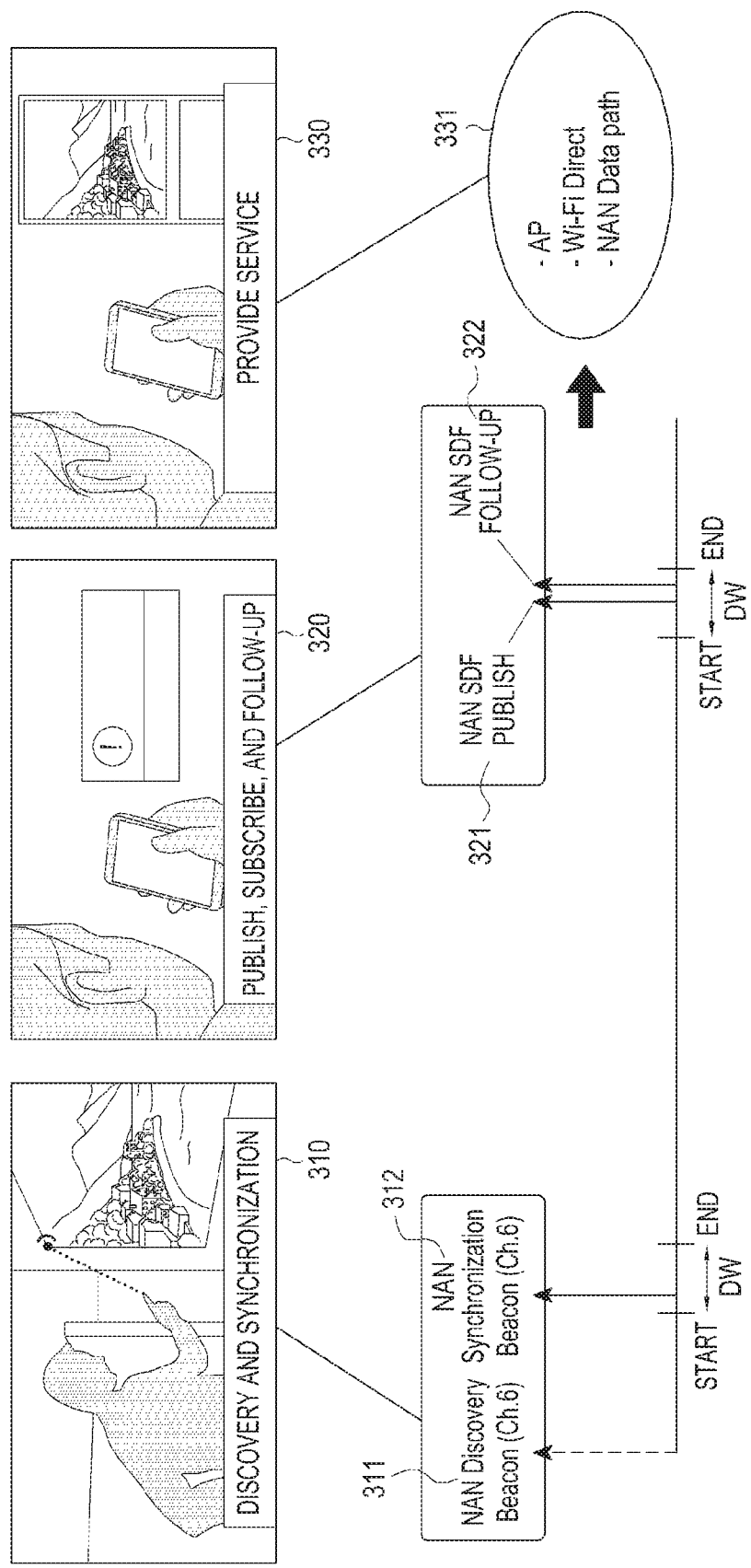
FIG. 3 is an illustration of a Wi-Fi setup scheme using a NAN scheme.

FIG. 3 is an illustration of a Wi-Fi setup scheme using a NAN scheme.

Referring to FIG. 3, a NAN scheme may support a background device search, a background service search, and a Wi-Fi connection, leading to energy savings as compared to legacy Wi-Fi. NAN scheme-based communication includes a discovery and synchronization (sync) process 310, service initialization, subscription and agreement (also referred to as publish & subscribe/follow-up) process 320, and a process 330 for providing a service via a Wi-Fi connection.

The discovery and sync process 310 is a process in which a terminal discovers an IoT device and synchronizes with the IoT device. For example, the process of discovering an IoT device is a process in which the IoT device sends at least one NAN discovery beacon 311. The NAN discovery beacon 311 is a packet that is sent to allow a terminal in a cluster to discover an IoT device. In the process of synchronizing the terminal with the IoT device, the terminal, which receives at least one NAN discovery beacon 311, is synchronized with the IoT device through the transmission and reception of a NAN synchronization beacon 312 with the IoT device. The NAN synchronization beacon 312 is a packet that is sent for synchronizing the IoT device with the terminal. The transmission and reception of the NAN discovery beacon 311 and the NAN synchronization beacon 312 may be carried out on channel 6 during a discovery window (DW) period.

The NAN-type service initialization, subscription, and agreement process 320 is a process of transmission and reception of a NAN service discovery frame (NANSDF) publish 312 and NAN service discovery frame (NAN SDF) follow-up 322. For example, the service initialization, subscription, and agreement process is a process of transmission of the NAN SDF publish 321 from the IoT device to the synchronized terminal. The synchronized terminal may recognize the provision of a NAN service by receiving the NAN SDF publish 321. The agreement process is a process of transmission of the NAN SDF follow-up 322 from the terminal, which receives the NAN SDF publish 321 and agrees to connect with the IoT device, to the IoT device. The transmission and reception of the NAN SDF publish 321 and the NAN SDF follow-up 322 may be conducted on channel 6 during a DW period.

The "service via Wi-Fi connection" process 330 is a process of delivering service frames through a Wi-Fi connection. As described above, the NAN scheme allows a terminal to connect with an IoT device through Wi-Fi direct and NAN data path 331.

Figure 4:
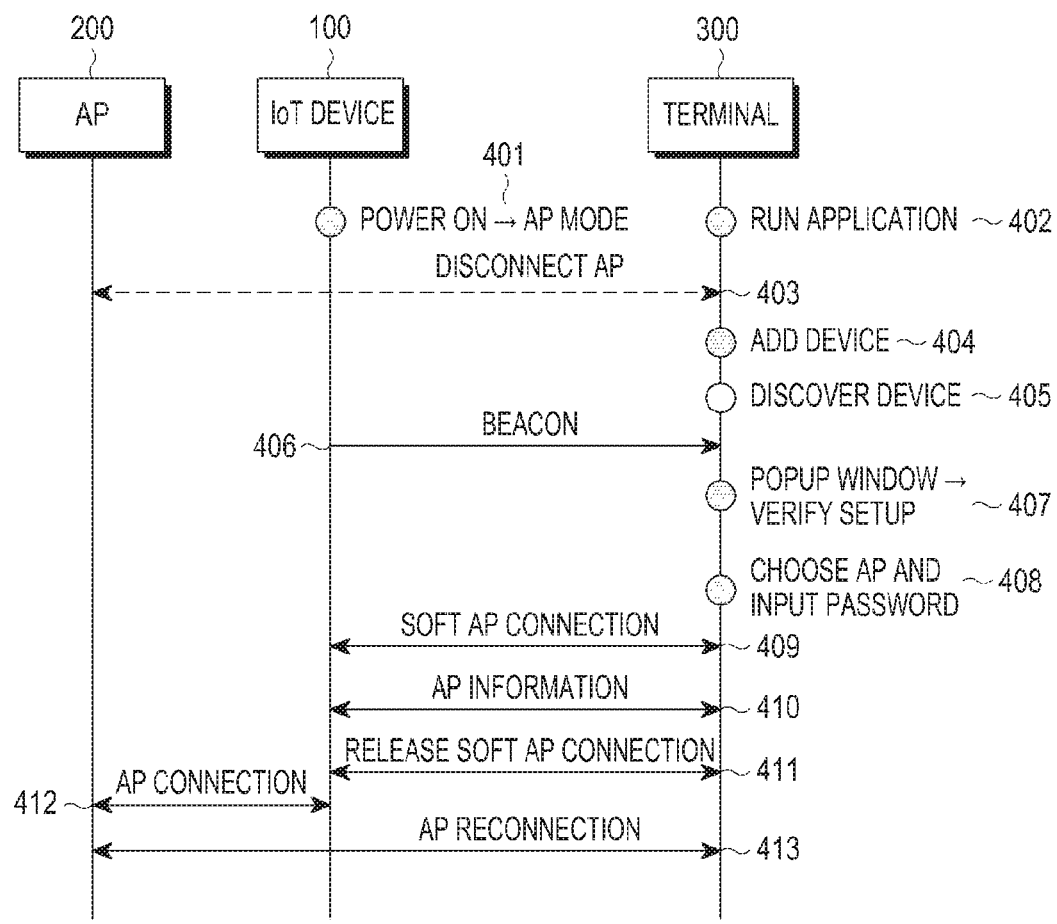
FIG. 4 is a flow diagram of a soft AP-based Wi-Fi setup scheme.

FIG. 4 is a flow diagram of a soft AP-based Wi-Fi setup scheme.

Referring to FIG. 4, an IoT device 100, which serves as a NAN enrollee, powers on and operates in an AP mode in step 401. A terminal 300, which serves as a NAN configurator, may run an application for providing a Wi-Fi setup service for the IoT device 100 in step 402. In this case, the terminal 300 becomes disconnected from the AP 200, i.e., an AP disconnection state in step 403. The terminal 300 adds the IoT device 100 in step 404 and then discovers the IoT device 100 in step 405. Upon receiving a beacon from the IoT device 100, the terminal 300 displays a popup window to receive a setup verification from the user in step 407.

When the terminal 300 receives an input for an AP selection and a password for setup verification from the user through the popup window in step 408, the IoT device 100 and the terminal 300 are connected, i.e., a software-enabled access point (soft AP) connection state in step 409. In this case, the soft AP connection state indicates a state in which the IoT device 100 having AP function-implemented software operates like the AP 200 so that the IoT device 100 and the terminal 300 are connected. The terminal 300 sends AP information about the AP 200 to the IoT device 100 in step 410 and then releases the connection to the IoT device 100 and enters into a soft AP connection released state in step 411. The IoT device 100 connects to the AP 200 based on the AP information, entering into the AP connection state in step 412. Thereafter, the terminal 300 establishes a reconnection with the AP 200 in step 413.

The above-described soft AP-based Wi-Fi setup scheme requires additional processes, such as the release of the AP-terminal connection and reconnection, due to connection-based information exchange, resulting in a time-consuming Wi-Fi setup.

Figure 5:
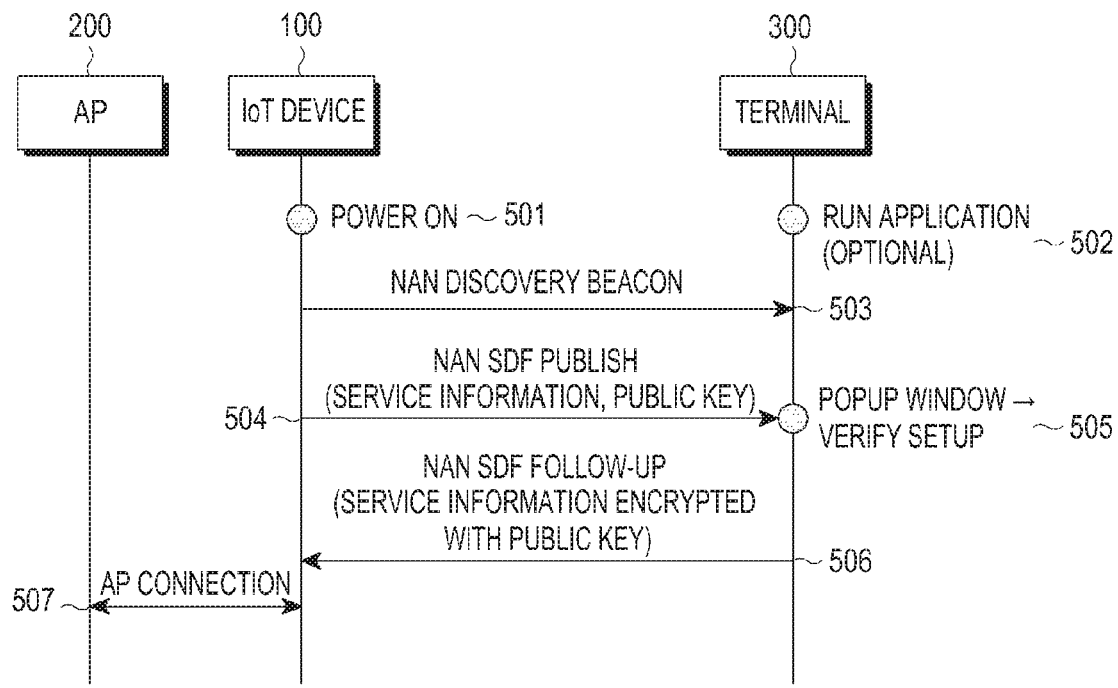
FIG. 5 is a flow diagram of a NAN-based method for connecting an IoT device to an AP according to an embodiment of the present disclosure.

FIG. 5 is a flow diagram of a NAN-based method for connecting an IoT device to an AP according to an embodiment of the present disclosure.

Referring to FIG. 5, an IoT device 100 powers on in step 501 and starts a device discovery operation. A terminal 300 may run an application for providing a Wi-Fi setup service of the IoT device 100 in step 502. For discovery of a device, the IoT device 100 sends a NAN discovery beacon to the terminal 300 in step 503. In addition, the IoT device 100 sends a NAN SDF publish to the terminal 300 in step 504. Then, the NAN SDF publish contains service information. The service information may include information, e.g., a public key, necessary for a Wi-Fi setup scheme, such as easy setup or relay-based setup, and the security scheme of the IoT device 100 and the terminal 300. The terminal 300 displays a popup window to receive a setup verification from the user in step 505. In addition, the terminal 300 sends a NAN SDF follow-up to the IoT device 100. The NAN SDF follow-up contains service information encrypted with a public key in step 506. The service information may include AP information that is used for connection with the AP 200. When the IoT device 100 receives the NAN SDF follow-up, the IoT device 100 is connected with the AP 200, entering into the AP connection state in step 507.

In an embodiment of the present disclosure, the NAN SDF publish contains the AP information, and the Wi-Fi setup is performed in a non-connection based scheme, reducing the Wi-Fi setup time.

Figure 6:
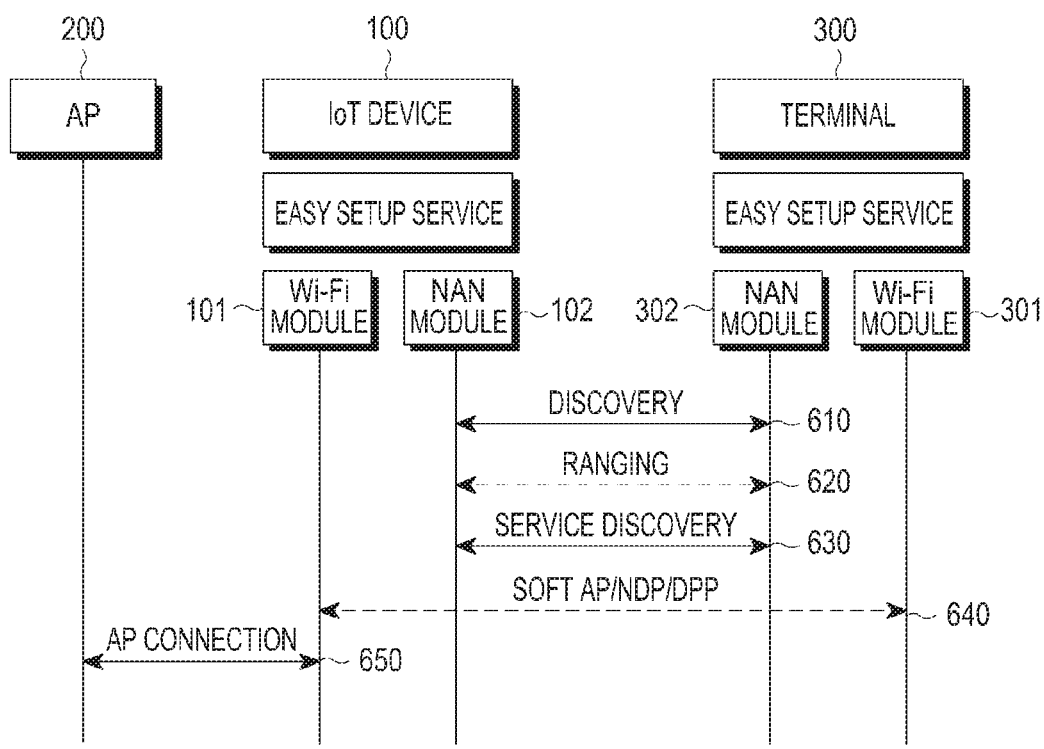
FIG. 6 is a flow diagram of hierarchical operations of a NAN-based method for connecting an IoT device to an AP according to an embodiment of the present disclosure.

FIG. 6 is a flow diagram of hierarchical operations of a NAN-based method for connecting an IoT device to an AP according to an embodiment of the present disclosure.

Referring to FIG. 6, an IoT device 100 supports an easy setup service. The IoT device 100 includes a Wi-Fi module 101 and a NAN module 102. A terminal 300 supports the easy setup service. The terminal 300 includes a Wi-Fi module 301 and a NAN module 302.

The NAN module 102 of the IoT device 100 and the NAN module 302 of the terminal 300 perform a discovery process in step 610, a ranging process in step 620, and a service discovery process in step 630. The discovery process in step 610 indicates a device discovery process performed by the IoT device 100. In the ranging process in step 620, the IoT device 100 may recognize whether the terminal 300 exists in the same space as the IoT device 100. In the ranging process in step 620, the IoT device 100 may perform a joint recognition operation that utilizes a distance measured based on a NAN-based ranging operation and received signal strength indication (RSSI) information. The service discovery process in step 630 includes a connection process between the IoT device 100 and the terminal 300 as per a security scheme. The service discovery process in step 630 may also include a process for delivering AP information according to the security scheme. The security scheme may include at least one of a connection-less scheme, a NAN data path security scheme, a soft AP security scheme, or a device provisioning protocol (DPP) security scheme.

Where the security scheme is the connection-less scheme, a process for delivering AP information may be performed in the service discovery process in step 630. After the service discovery process in step 630, the IoT device 100 performs a process in step 650 for connecting (or associating) the IoT device 100 with the AP 200. In the case of the connection-less scheme, connectionless-based AP information delivery may be conducted to reduce the setup time.

Where the security scheme is the NAN data path security scheme, soft AP security scheme, or DPP security scheme, the Wi-Fi module 101 of the IoT device 100 and the Wi-Fi module 301 of the terminal 300 perform a connection process in step 640 via the soft AP security scheme, NAN data path (NDP) security scheme, or DPP security scheme. The connection process in step 640 includes an AP information delivery process after the IoT device 100 and the terminal 300 are connected through the soft AP security scheme, NDP security scheme, or DPP security scheme. After the delivery of the AP information, the IoT device 100 and the AP 200 perform a connection process in step 650. The NDP security scheme, soft AP security scheme, and DPP security scheme may conduct the delivery of AP information through at least one of various data paths, e.g., various connections utilizing the soft AP, NDP, and DPP.

The IoT device 100 and the terminal 300 may support a relay-based setup. The relay-based setup is a service in which the IoT device 100 is connected to the AP 200 via another device (e.g., a relay) connected to the AP 200. The relay-based setup by the IoT device 100 is described below in greater detail with reference to FIGS. 26 to 29.

Figure 7:
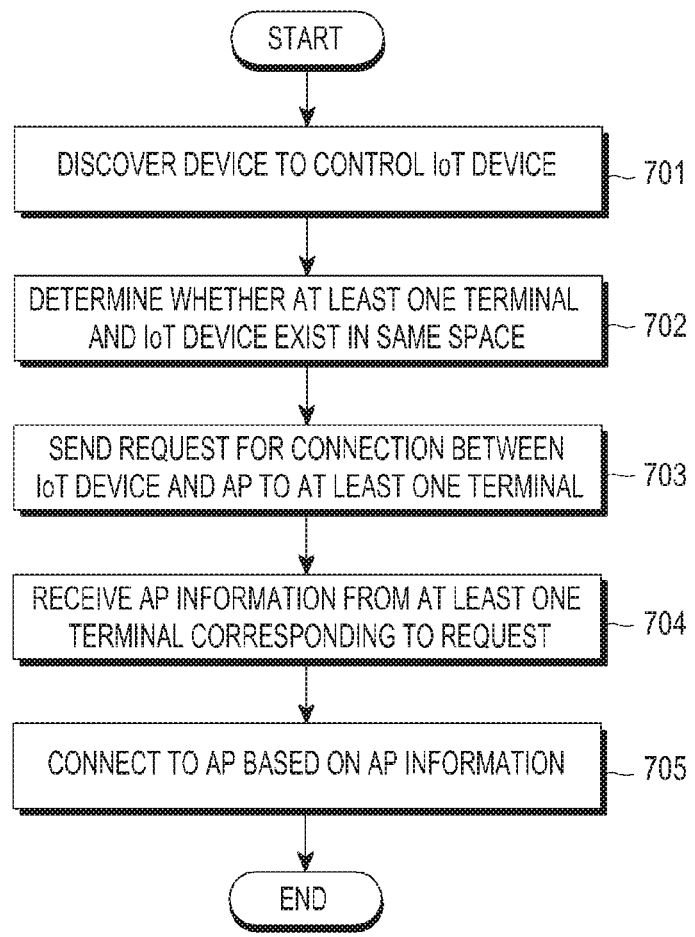
FIG. 7 is a flowchart of a NAN-based AP connection method by an IoT device according to an embodiment of the present disclosure.

FIG. 7 is a flowchart of a NAN-based AP connection method by an IoT device according to an embodiment of the present disclosure.

Referring to FIG. 7, an IoT device discovers a device to control the IoT device in step 701. The IoT device may send a NAN discovery beacon to discover the device to control the IoT device. By sending the NAN discovery beacon, the IoT device may detect at least one terminal that provides AP information necessary for connection between the IoT device and an AP. At least one terminal detected may provide AP information about different APs. The different APs may exist in the same or a different space than the IoT device and the terminal.

The IoT device performs a "determine-whether-to-exist-in-same-space" operation for determining whether at least one terminal detected through the device discovery exists in the same space as the IoT device in step 702. The "determine-whether-to-exist-in-same-space" operation indicates an operation of determining whether the at least one terminal is present in the same space as the IoT device. By performing the "determine-whether-to-exist-in-same-space" operation on the at least one terminal, the IoT device may obtain AP information about an AP that is present in the same space as the IoT device. In other words, the IoT device determines that the AP corresponding to the AP information provided from the terminal present in the same space as the IoT device also exists in the same space as the IoT device.

According to an embodiment of the present disclosure, the IoT device may measure the distance between the IoT device and the at least one terminal and calculate an RSSI of the at least one terminal. In the process of measuring the distance between the IoT device and the at least one terminal, the IoT device may send a predetermined signal to the at least one terminal. The IoT device may receive a response to the signal from the at least one terminal and measure the distance from the at least one terminal based on a round trip time (RTT) of the signal and the response.

In the process of calculating the RSSI of the at least one terminal, the IoT device may send a predetermined signal to the at least one terminal and measure the signal strength (i.e., an RSSI) of a received response to the signal.

The IoT device may determine that, among the at least one terminal, one terminal meeting the conditions that the distance is less than a predetermined threshold distance and the RSSI is greater than a predetermined threshold RSSI is present in the same space.

The IoT device sends a request for connection between the IoT device and the AP to the at least one terminal in step 703. In this case, the IoT device may send the request to all of the terminals detected by the device discovery or to only the terminal determined to be present in the same space. In this case, the request is in a NAN SDF publish in the form of a frame and contains information about a security scheme between the IoT device and the at least one terminal. The security scheme may be at least one of the connection-less scheme, a NDP security scheme, a soft AP security scheme, or a DPP security scheme. In other words, the IoT device may include one security scheme in the request or may include multiple security schemes in the request. When a plurality of security schemes are included in the request, one of the plurality of security schemes may be selected by a terminal receiving the request.

The IoT device receives AP information from at least one terminal corresponding to the request in step 704. According to an embodiment of the present disclosure, the IoT device may receive AP information about the same AP from the at least one terminal. The IoT device may receive AP information about different APs from the at least one terminal.

According to an embodiment of the present disclosure, before the IoT device receives AP information from the at least one terminal, the IoT device and the at least one terminal may be connected by the security scheme. When the IoT device and the at least one terminal are connected in the connection-less scheme, the AP information may be included in a frame-type NAN SDF follow-up and received. In other words, the IoT device may receive both AP information from a terminal present in the same space as the IoT device and AP information from a terminal not present in the same space. When the IoT device is connected with a terminal present in the same space among the at least one terminal detected by the device discovery in the NDP security scheme, soft AP security scheme, or DPP security scheme, the AP information from the terminal may be received based on the NDP security scheme, soft AP security scheme, or DPP security scheme selected by the terminal.

The IoT device connects to the AP based on the received AP information in step 705. According to an embodiment of the present disclosure, the IoT device may connect to the AP using AP information from one selected terminal of AP information received from a plurality of terminals. According to an embodiment of the present disclosure, the IoT device may connect to the AP based on AP information received from a terminal present in the same space of AP information received from at least one terminal. The IoT device may determine to use AP information from a terminal having the greatest RSSI among at least one terminal identified to exist in the same space.

According to an embodiment of the present disclosure, where the IoT device fails to connect with the AP, it may perform a relay-based setup. For example, when a connection attempt based on AP information from a first terminal among terminals detected by the device discovery fails, the IoT device may re-discover at least one terminal except for the first terminal. The IoT device may choose one of at least one terminal detected through the device discovery as a second terminal and connect with the second terminal based on a security scheme between the IoT device and the second terminal. In this case, the security scheme is one of the soft AP security scheme and the NDP scheme. As the second terminal connects to the IoT device, the IoT device may receive AP information of the second terminal through the second terminal.

Figure 8:
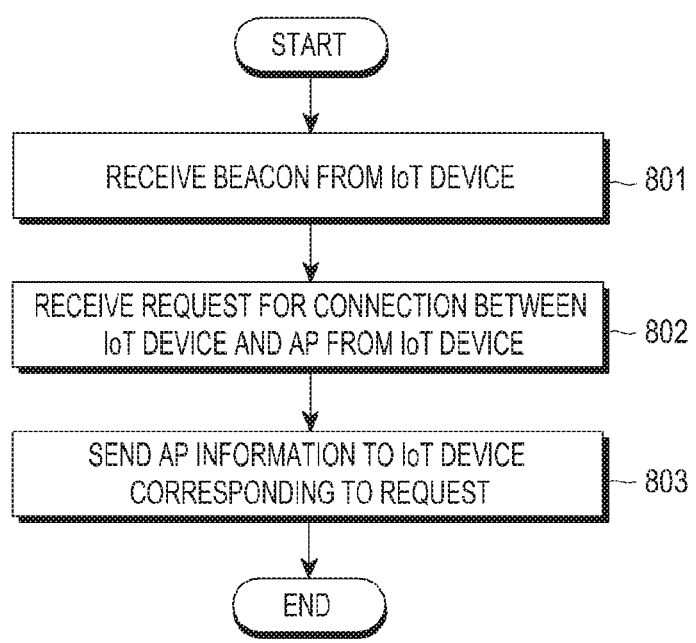
FIG. 8 is a flowchart of a NAN-based method for connecting an IoT device to an AP by a terminal according to an embodiment of the present disclosure.

FIG. 8 is a flowchart of a NAN-based method for connecting an IoT device to an AP by a terminal according to an embodiment of the present disclosure.

Referring to FIG. 8, a terminal receives a NAN discovery beacon from an IoT device in step 801. The NAN discovery beacon is in the form of a frame that the IoT device sends to discover a device.

The terminal may receive a predetermined signal from the IoT device. In this case, the signal is one sent for the IoT device to perform the "determine-whether-to-exist-in-same-space" operation on the terminal. The terminal may send a response to the signal to the IoT device. The response may be used for the IoT device to measure the distance from the terminal and/or the RSSI.

Where the IoT device determines that the terminal is present in the same space, the terminal may receive a request for connection between the IoT device and the AP from the IoT device in step 802. In this case, the request is in a NAN SDF publish in the form of a frame and contains information about a security scheme between the IoT device and the terminal. The security scheme may be at least one of the connection-less scheme, a NDP security scheme, a soft AP security scheme, or a DPP security scheme. In other words, the IoT device may include one security scheme in the request or may include multiple security schemes in the request. Where a plurality of security schemes are included in the request, the terminal may choose one of the plurality of security schemes, include the chosen security scheme in a frame-type NAN SDF follow-up, and send the same to the IoT device. The terminal may connect to the IoT device based on the chosen security scheme.

Corresponding to the request, the terminal sends, to the IoT device, AP information necessary for connection with the AP linked to the terminal. In other words, the terminal sends the AP information to the IoT device according to the security scheme included in the request. Then, when the plurality of security schemes are included in the request, the terminal may send the AP information to the IoT device based on the chosen security scheme. The AP information is used for the IoT device to set up a connection to the AP.

Figure 9:
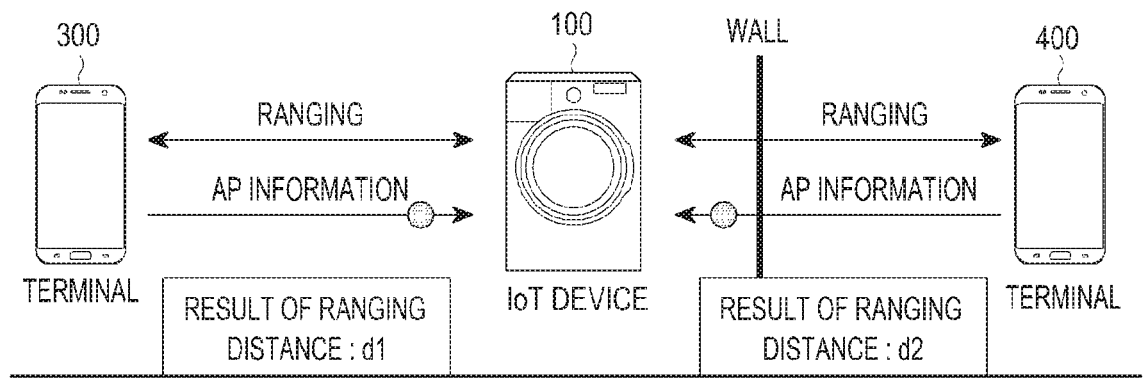
FIG. 9 is an illustration of an operation for identifying a terminal in a same space based on a distance measured by a ranging result in a Wi-Fi setup scheme.

FIG. 9 is an illustration of an operation for identifying a terminal in a same space based on a distance measured by a ranging result in a Wi-Fi setup scheme.

Referring to FIG. 9, a terminal 300 may be present in the same space (e.g., a room) as an IoT device 100, and a terminal 400 may be present in a different space (e.g., another room partitioned by a wall) than that of the IoT device 100. The IoT device 100 may measure distances d1 and d2 from its ambient terminals 300 and 400 by performing a ranging procedure as per a Wi-Fi setup scheme through NAN P2P connection.

Where only the distances from the terminals 300 and 400 are used to perform the operation of determining whether the IoT device 100 is present in the same space as the IoT device 300, the IoT device 100 may misrecognize that both of the terminals 300 and 400 are present in the same space as the IoT device 100. In this case, the IoT device 100 may use both AP information from the terminal 300 and AP information from the terminal 400 in connecting to a corresponding AP. However, the terminal 400 may be present behind a wall but might not exist in the same space as the IoT device 100.

Since a Wi-Fi frequency band signal may pass through the wall, a determination as to whether the terminal 400 is present in the same space might not be precisely performed only with the distance obtained by the IoT device 100 through ranging.

Figure 10:
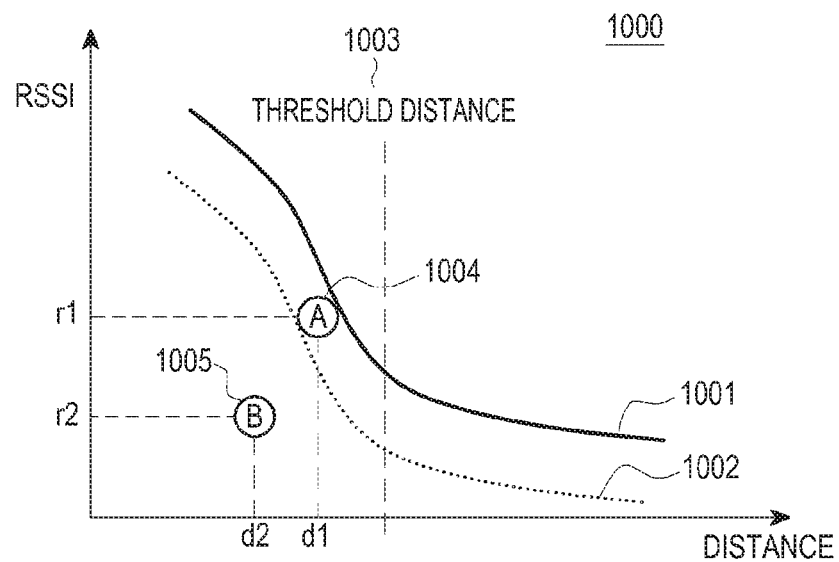
FIG. 10 is a graph of a joint recognition operation based on an RSSI and a distance according to an embodiment of the present disclosure.

FIG. 10 is a graph of a joint recognition operation based on a RSSI and a distance according to an embodiment of the present disclosure.

Referring to FIG. 10, an RSSI-distance graph 1000 includes a mean value 1001 of results of ranging, a minimum reference 1002 for the existence in the same space, and a predetermined threshold distance 1003. The ranging result mean value 1001 may be calculated based on results of ranging measured on a plurality of terminals by the IoT device 100. The minimum reference 1002 for the existence in the same space is determined based on the ranging result mean value 1001, and is a reference for a minimum RSSI predicted according to the distance. The RSSI-distance graph 1000 includes a ranging result 1004 of the terminal 300 positioned away from the IoT device 100 at distance d1 and a ranging result 1005 of the terminal 400 positioned away from the IoT device 100 at distance d2. d1 of the ranging result 1004 of the terminal 300 and d2 of the ranging result 1005 of the terminal 400, are both less than a predetermined threshold distance 1003. The terminal 300 present in the same space as the IoT device 100 has an RSSI of r1 which falls within a range between a maximum reference 1001 for determining whether the terminal 300 is in the same space and a minimum reference 1002 for determining whether the terminal 300 is in the same space. However, the terminal 400 which is not present in the same space as the IoT device has an abnormal RSSI of r2 that does not reach the minimum reference 1002 for determining whether the terminal 400 is in the same space. Thus, according to a subsequent embodiment, the IoT device determines whether each terminal is present in the same space as the IoT device 100 using the RSSI in addition to the distances from the terminals. According to an embodiment of the present disclosure, the RSSI of each terminal may be obtained through a ranging procedure like the distances are obtained.

Figure 11:
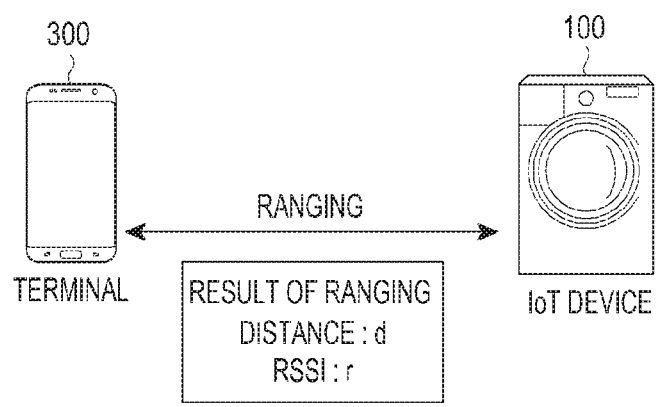
FIG. 11 is an illustration of a ranging result for a joint recognition operation according to an embodiment of the present disclosure.

FIG. 11 is an illustration of a ranging result for a joint recognition operation according to an embodiment of the present disclosure.

Referring to FIG. 11, an IoT device 100 may measure a distance, d, from the terminal 300 and calculate an RSSI, r, of the terminal 300 through the ranging of the terminal 300.

Figure 12:
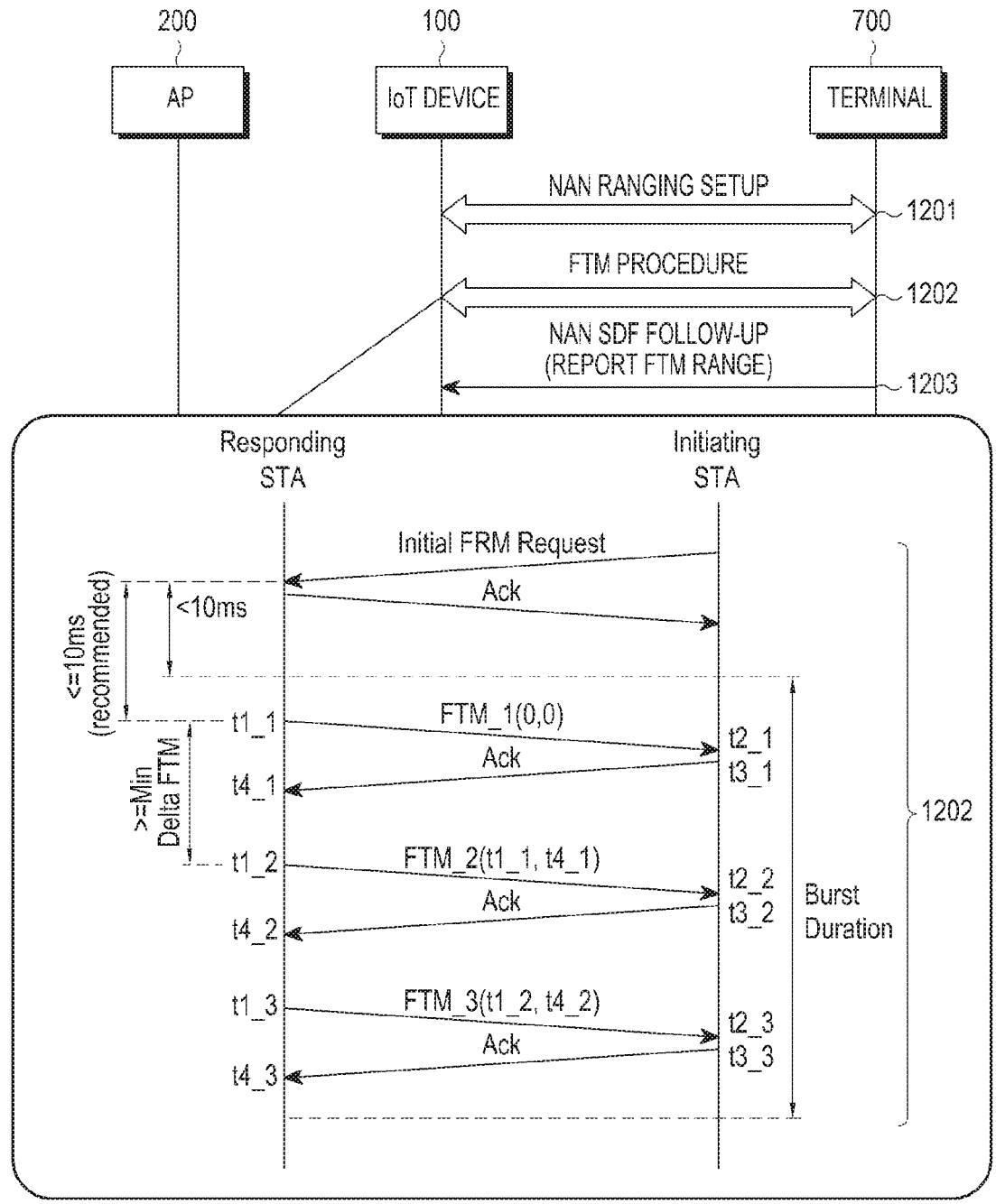
FIG. 12 is a flow diagram of a NAN-based ranging procedure.

FIG. 12 is a flow diagram of a NAN-based ranging procedure.

Referring to FIG. 12, an IoT device 100, along with a terminal 700, performs a NAN ranging setup process in step 1201 and a fine timing measurement (FTM) process in step 1202. In the FTM process in step 1202, the IoT device 100 which serves as an initiating station (STA), sends an initial FTM request to a responding STA and receives an acknowledgment response (ACK) from a terminal 300 which serves as the responding STA. During each measurement session, the IoT device 100 calculates an FTM range, i.e., the distance between the IoT device 100 and the terminal 300, based on times t1_1, t1_2, and t1_3 when FTM frames FTM_1, FTM_2, and FTM_3 are sent and times t4_1, t4_2, and t4_3 when ACKs are received through the exchange of the FTM frames and the ACKs between the IoT device 100 and the terminal 300. The terminal 300 may send a NAN SDF follow-up for reporting the FTM range to the IoT device 100 in step 1203. In addition, the IoT device 100 measures the RSSI of a signal received from the terminal 700, e.g., a wireless signal containing an ACK. The IoT device 100 may determine a final RSSI by averaging RSSIs for at least one measurement session.

Figure 13:
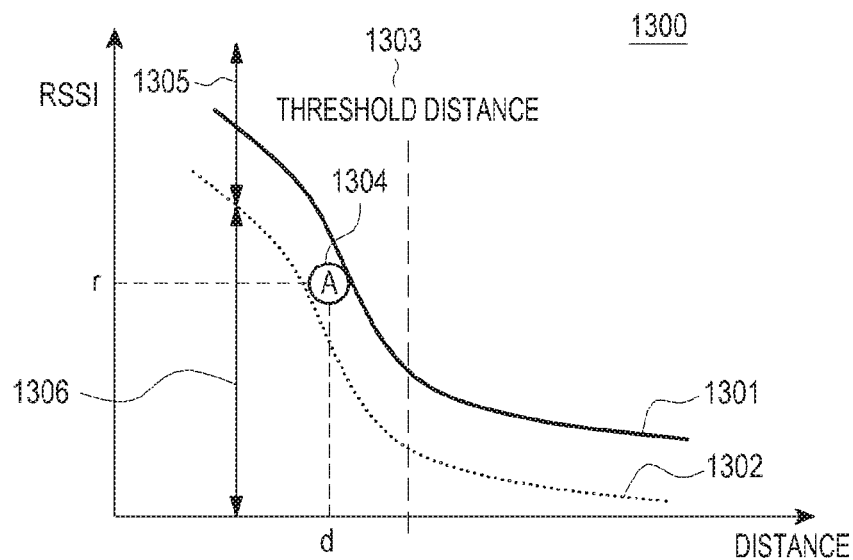
FIG. 13 is a graph of a joint recognition operation based on a distance and an RSSI according to an embodiment of the present disclosure.

FIG. 13 is a graph of a joint recognition operation based on a distance and an RSSI according to an embodiment of the present disclosure.

Referring to FIG. 13, an RSSI-distance graph 1300 includes a mean value 1301 of results of ranging, a minimum reference 1302 for the existence in the same space, and a predetermined threshold distance 1303. The RSSI-distance graph 1300 includes the ranging result 1304 of the terminal indicating that the distance from the IoT device is d, and the RSSI is r. The ranging result 1304 of the terminal is greater than the minimum reference 1302 for the existence in the same space. Thus, the terminal is recognized to be present 1305 in the same space as the IoT device by the IoT device. When the ranging result of the terminal is less than the minimum reference 1302 for the existence in the same space, the terminal is recognized to be not present 1306 in the same space as the IoT device by the IoT device.

Figure 14:
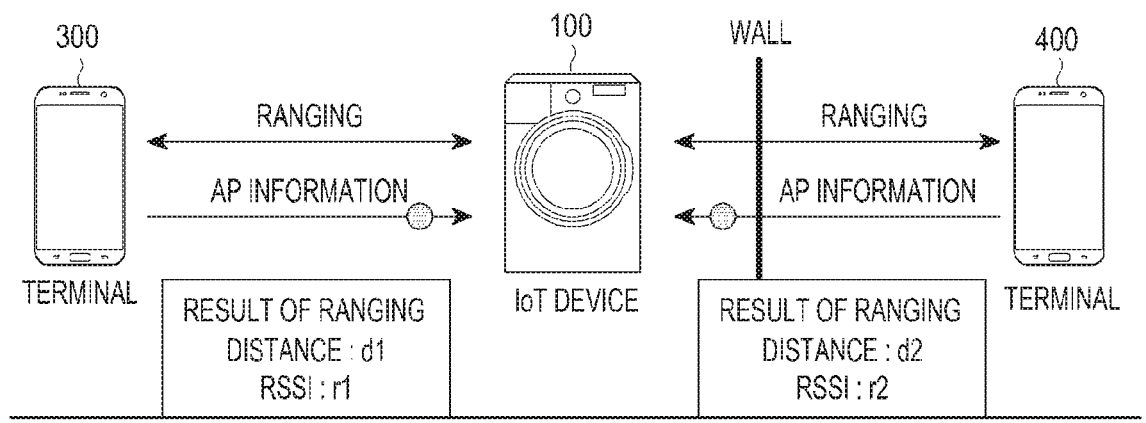
FIG. 14 is an illustration of a joint recognition operation based on a distance and an RSSI according to an embodiment of the present disclosure.

FIG. 14 is an illustration of a joint recognition operation based on a distance and an RSSI according to an embodiment of the present disclosure.

Referring to FIG. 14, an IoT device 100 may measure a distance, d1, between a terminal 300 and the IoT device 100 and calculate an RSSI, r1, of the terminal 300 by performing a ranging procedure. The IoT device 100 recognizes that the terminal 300 is present in the same space based on the calculated RSSI and the distance from the terminal 300 and receives AP information from the terminal 300.

The IoT device 100 may measure a distance, d2, between a terminal 400 and the IoT device 100 and calculate an RSSI, r2, of the terminal 400 through a ranging procedure. Then, since the terminal 400 is positioned behind the wall, the terminal 400 has RSSI r2 which is less than r1 although the distance from the IoT device 100 is short. Accordingly, the IoT device 100 may determine that the terminal 400 is not present in the same space as the IoT device 100 and determine not to use AP information from the terminal 400 in Wi-Fi setup.

Figure 15:
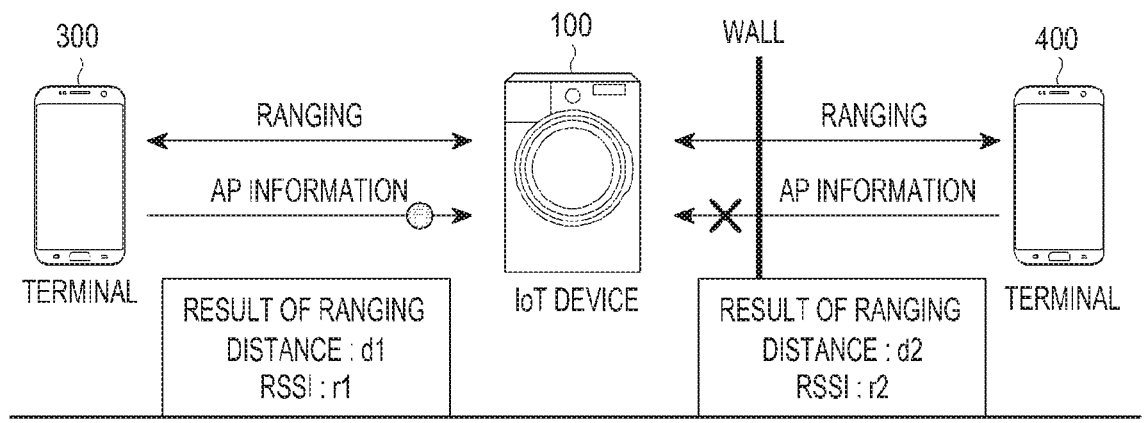
FIG. 15 is an illustration of a setup procedure by a joint recognition operation according to an embodiment of the present disclosure.

FIG. 15 is an illustration of a setup procedure as per a joint recognition operation according to an embodiment of the present disclosure.

Referring to FIG. 15, an IoT device 100 performs a joint recognition operation on ranging for calculating the distance from each terminal and an RSSI. The IoT device 100 may measure distance d1 from the terminal 300 and calculate RSSI r1 of the terminal 300 by performing ranging. The IoT device 100 may also measure distance d2 from the terminal 400 and calculate RSSI r2 of the terminal 400. When d1 and d2 are less than a predetermined threshold distance so that the condition for determining whether it is in the same space is met for distance, but r2 is less than a predetermined threshold RSSI so that the condition for determining whether it is in the same space is not met for RSSI, the IoT device 100 may determine that the terminal 400 is not present in the same space as the IoT device 100.

In other words, the IoT device 100 performs the "determine-whether-to-exist-in-same-space" operation on the terminals 300 and 400 considering both the distances between the IoT device 100 and the terminals 300 and 400 and the RSSIs of the terminals 300 and 400 before initiating an easy setup scheme. The IoT device 100 may connect to a corresponding AP using only AP information sent from the terminal 300 that is recognized to be present in the same space.

Figure 16:
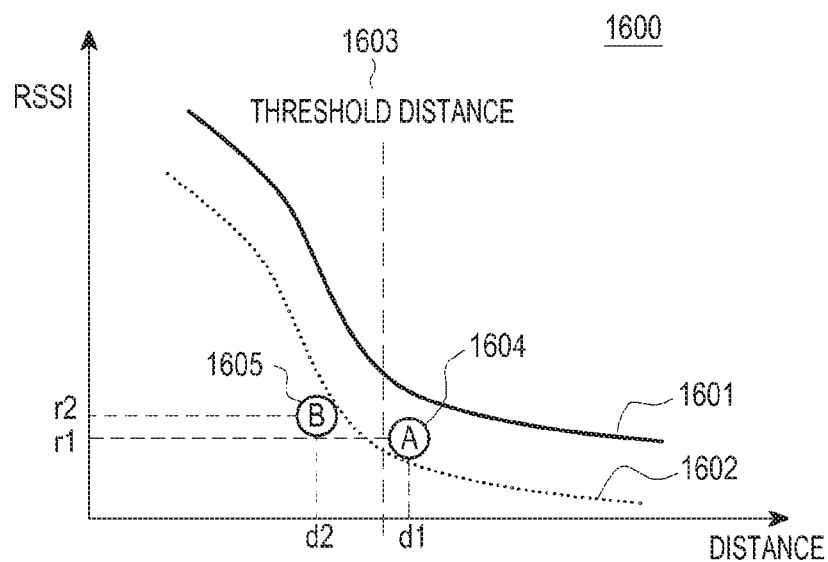
FIG. 16 is a graph of a recognition error that may arise in a joint recognition operation based on a distance and an RSSI according to an embodiment of the present disclosure.

FIG. 16 is a graph of a recognition error that may arise in a joint recognition operation based on a distance and an RSSI according to an embodiment of the present disclosure.

Referring to FIG. 16, an RSSI-distance graph 1600 includes a mean value 1601 of results of ranging, a minimum reference 1602 for the existence in the same space, and a predetermined threshold distance 1603. The RSSI-distance graph 1600 includes a ranging result 1604 of terminal 1 indicating that the distance is d1 and the RSSI is r1 and a ranging result 1605 of terminal 2 indicating that the distance is d2 and the RSSI is r2. For the ranging result 1604 of terminal 1, r1 may not reach the maximum reference 1601 for the existence in the same space, and d1 may exceed a predetermined threshold distance 1603 due to errors in wireless channel measurement in such case. In this case, although terminal 1 is actually present in the same space as the IoT device, the IoT device may misrecognize that terminal 1 is not present in the same space as the IoT device.

The IoT device may further perform an operation for reducing errors that arise from wireless channel environment measurement through monitoring before starting a Wi-Fi setup. According to an embodiment of the present disclosure, the IoT device may reduce RSSI measurement errors due to radio interference using a predetermined threshold RSSI. For example, the IoT device may utilize a value obtained by subtracting the predetermined threshold RSSI from the RSSI measured through the ranging procedure in recognizing whether it is in the same space. For example, where the value obtained by subtracting the predetermined threshold RSSI from the measured RSSI is close to 0, the IoT device may provide an additional indicator for reattempting ranging and utilize a value obtained by subtracting the predetermined RSSI from a RSSI measured after providing the additional indicator in recognizing whether it is in the same space.

According to an embodiment of the present disclosure, the IoT device may provide an additional indicator as per the capability of the IoT device in order to enhance the accuracy of the "determine-whether-to-exist-in-same-space" operation. For example, where the IoT device is a TV, the IoT device may display an indication, e.g., "set up within a short distance for security purposes," or "please shake your cell phone," on the screen when an easy setup begins. Where the IoT device has a speaker, the IoT device may output the indication in voice. Accordingly, where an additional indicator is used for short-distance setup, the ranging results of the terminals may be varied by the additional indicator.

Figure 17:
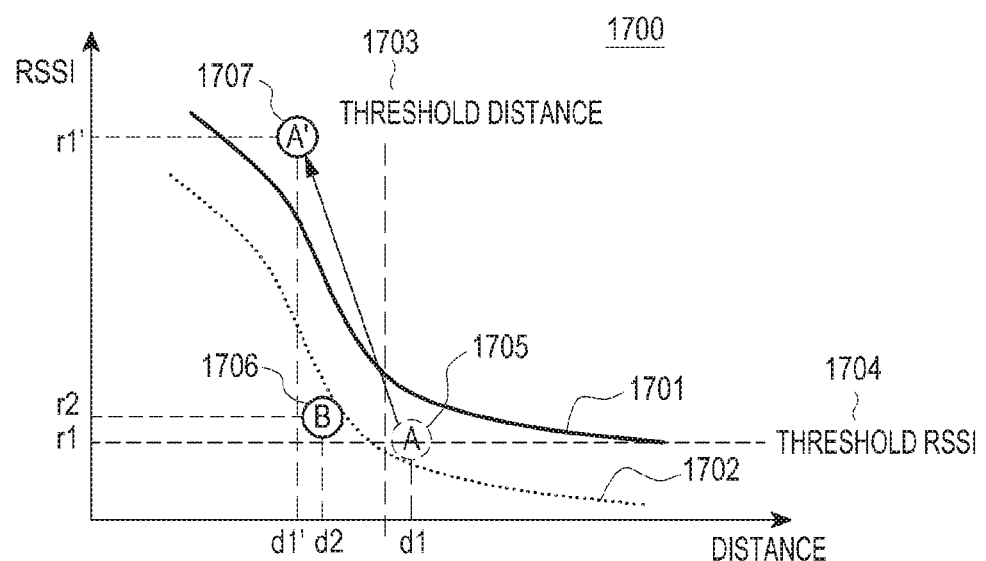
FIG. 17 is a graph of an operation for determining a same space, having an additional indicator applied thereto.

FIG. 17 is a graph of an operation for determining a same space, having an additional indicator applied thereto.

Referring to FIG. 17, an RSSI-distance graph 1700 includes a mean value 1701 of results of ranging, a minimum reference 1702 for the existence in the same space, and a predetermined threshold distance 1703. The RSSI-distance graph 1700 further includes a predetermined threshold RSSI 1704. The predetermined threshold RSSI 1704 is a reference for providing an additional indicator to reattempt ranging.

The RSSI-distance graph 1700 includes a ranging result 1706 of terminal 2 having distance d2 and RSSI r2. Since r2 is less than the minimum reference 1702 for existence in the same space although distance d2 from terminal 2 is less than the predetermined threshold distance 1703, terminal 2 is recognized not to be present in the same space as the IoT device. In this case, since r2 is greater than the predetermined threshold RSSI 1704, no additional indicator is provided for remeasuring the RSSI of terminal 2.

The RSSI-distance graph 1700 includes a ranging result 1705 of terminal 1 indicating that the distance is d1 and the RSSI is r1. Although terminal 1 is actually present in the same space as the IoT device, e.g., if the space is broad so that the distance between the user carrying terminal 1 and the IoT device is great, distance d1 from terminal 1 is greater than the predetermined threshold distance 1703, and it may thus be recognized not to be present in the same space as the IoT device. Under the above circumstance, the IoT device fails to secure AP information for an easy setup. However, since r1 is not greater than the predetermined threshold RSSI 1704, the IoT device may attempt to remeasure the RSSI. In order to attempt to remeasure the RSSI, the IoT device may provide an additional indicator for the remeasurement of RSSI through the screen or speaker according to the capability of the IoT device. The user carrying terminal 1 which is present in the same space as the IoT device may visually or audibly recognize the additional indicator, and approach the IoT device or shake or move terminal 1 as per the additional indicator, thereby removing interference between the IoT device and terminal 1. For example, as the distance between the IoT device and terminal 1 reduces or interference between the IoT device and terminal 1 is removed, the new ranging result 1707 of terminal 1 may be rendered to include distance d1', which is less than the predetermined threshold distance 1703, and an RSSI r1' which is greater than r1.

Since the ranging result 1707 of terminal 1 has a distance d1' which is less than the predetermined threshold distance 1703 and r1' which is greater than the minimum reference 1702 for existence in the same space, the IoT device may recognize that terminal 1 is present in the same space as the IoT device, starting a Wi-Fi setup with terminal 1.

When the terminal does not perform an operation as per the additional indicator, when a plurality of terminals present in the same space all perform the operation as per the additional indicator, upon failure to identify a terminal present in the same space, or for other reasons, the ranging attempt by the IoT device may exceed a predetermined limit. According to an embodiment of the present disclosure, when the ranging attempt exceeds the predetermined limit, the IoT device may assume a failure to recognize the same space to reattempt a setup, or after receiving a serial number or random number to enhance security, reattempt a setup.

Figure 18:
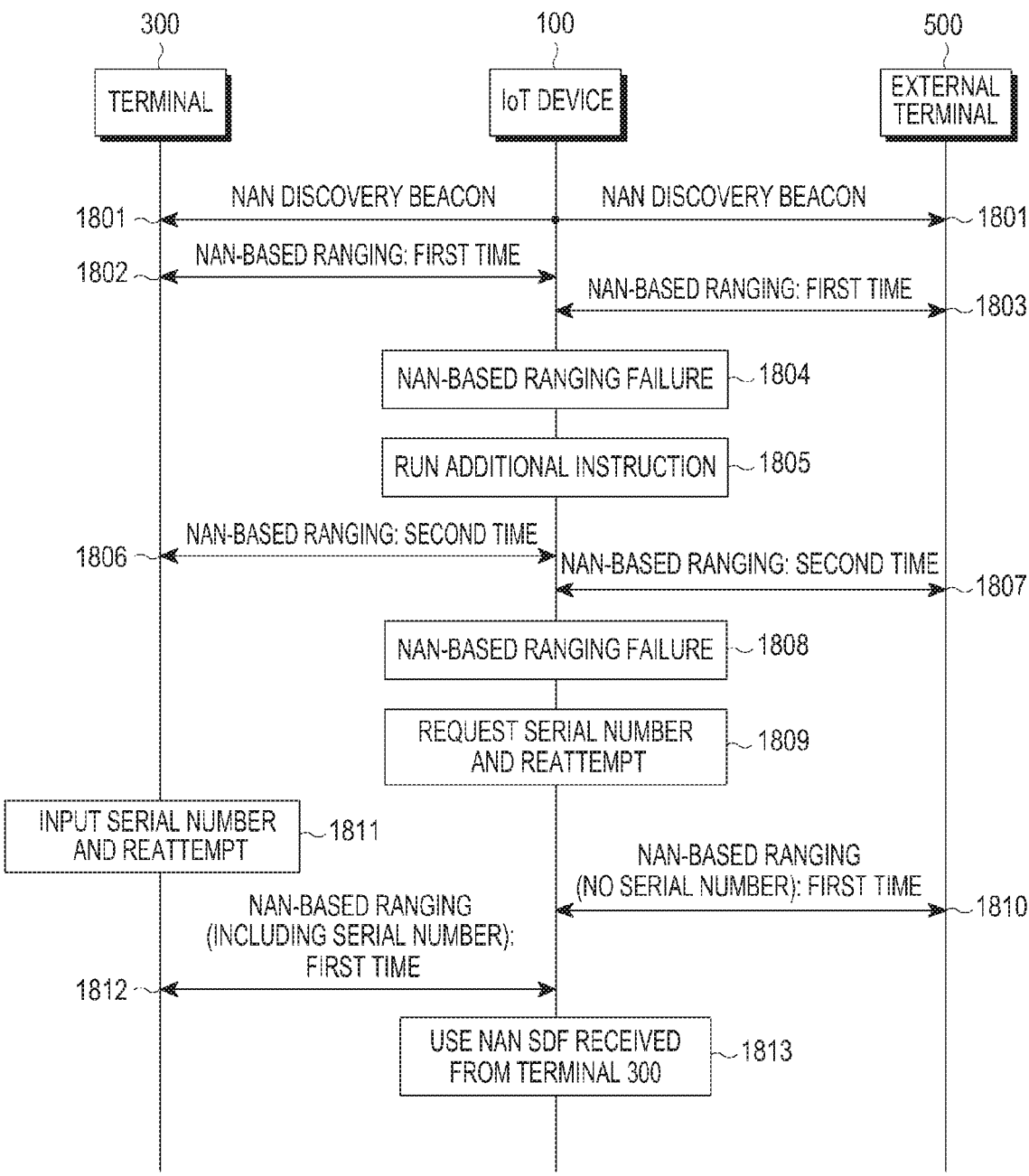
FIG. 18 is a flow diagram of a setup method upon exceeding a ranging attempt limit according to an embodiment of the present disclosure.

FIG. 18 is a flow diagram of a setup method upon exceeding a ranging attempt limit according to an embodiment of the present disclosure.

Referring to FIG. 18, where two times is the limit of ranging attempts, and an additional indicator is provided after the first attempt, the IoT device 100 may transmit NAN discovery beacons to ambient terminals 300 and 500 in step 1801 and attempt first NAN-based ranging on each terminal 300 and 500 in step 1802 and in step 1803. In this case, the IoT device 100 may fail to perform the NAN-based ranging in step 1802 and in 1803, in step 1804. For example, where a difference between a predetermined threshold RSSI and a measured RSSI is close to 0, the IoT device 100 may determine that the NAN-based ranging in step 1802 and in step 1803 fails. Since the ranging fails, the IoT device 100 provides an additional indicator in step 1805. For example, the user carrying the terminal 300 present in the same space as the IoT device 100 may visually or audibly recognize the additional indicator and approach the IoT device 100 or move or shake the terminal 300 according to the additional indicator. The IoT device 100 attempts the second NAN-based ranging with the terminals 300 and 500 in step 1806 and in step 1807. When the second NAN-based ranging fails in step 1808 despite the NAN-based ranging in step 1806 and in step 1807 after providing the additional indicator, the IoT device 100 may display a popup window requesting a serial number (or random number) and reattempt NAN-based ranging in step 1809. Since the terminal 500 is not present in the same space as the IoT device 100, the user of the terminal 500 cannot recognize the popup window, and thus, the IoT device 100 receives a ranging response with no serial number from the terminal 500 in step 1810. Since the terminal 300 is present in the same space as the IoT device 100, the user of the terminal 300 may input the serial number recognized through the popup window to the terminal 300 in step 1811. Accordingly, the IoT device 100 may receive a ranging response containing a serial number from the terminal 300 in step 1812. Since the ranging response containing a serial number is received from the terminal 300, the IoT device 100 uses NAN SDF(s) subsequently received from the terminal 300 in step 1813. The IoT device 100 obtains AP information from a NAN SDF subsequently received from the terminal 300 and uses the same in performing an easy setup. In contrast, since a ranging response with no serial number is received from the terminal 500, the IoT device 100 discards NAN SDF(s) received from the terminal 500.

Upon receiving ranging responses containing serial numbers (or random numbers) from a plurality of terminals, the IoT device 100 chooses the AP information sent from the terminal having the greatest RSSI or the highest priority among the plurality of terminals.

FIGS. 19 and 20 illustrate examples of tables of information exchanged between a terminal and an IoT device according to an embodiment of the present disclosure. In other words, the information shown in FIG. 19 may be contained in a request for AP information by an IoT device. The information of FIG. 20 may contain AP information provided from a terminal.

FIG. 19 is a table of security information as per a security scheme between an IoT device and a terminal according to an embodiment of the present disclosure.

Referring to FIG. 19, as described above, AP information is transmitted from a terminal to an IoT device based on a security scheme between the IoT device and the terminal and security information as per the security scheme. The security scheme may include option 1 1901 which is a connection-less security scheme, option 2 1902 which is a NDP security scheme, option 3 1903 which is a soft AP security scheme, and option 4 1904 which is a DPP security scheme. The security schemes match different pieces of security scheme, respectively.

Security information 1911 which is a public key matches option 1 1901 which is a connection-less security scheme. Security information 1912 does not match option 2 1902 which is a NDP security scheme. In other words, option 2 1902 does not contain security information. Security information 1913 which is soft AP information matches option 3 1903 which is a soft AP security scheme. The soft AP information 1913 may contain information about a service set identifier (SSID), an operating channel, and a personal identification number (PIN). Option 4 1904 which is a DPP security scheme matches DPP security information 1914. The DPP security information may be, e.g., an identity key or a supported security mechanism.

FIG. 20 is a table of configuration data as per a security scheme between an IoT device and a terminal according to an embodiment of the present disclosure.

Referring to FIG. 20, configuration data as per the security scheme between an IoT device and a terminal denotes AP information provided from the terminal and has different attribute types depending on security schemes. Each attribute type matches a different attribute value.

The attribute type of a connection-less security scheme is a WLAN attribute 2021 that matches an attribute value, "SSID," 2031. The attribute type of a NDP security scheme is a configurator key 2022 that matches an attribute value, "key information," 2032. The attribute type of a soft AP security scheme is a password 2023 that matches an attribute value, "passphrase," 2033. The attribute type of a DPP security scheme is a media access control (MAC) address (AP_MAC) of an AP that matches a MAC address 2034 assigned to the AP.

Figure 21:
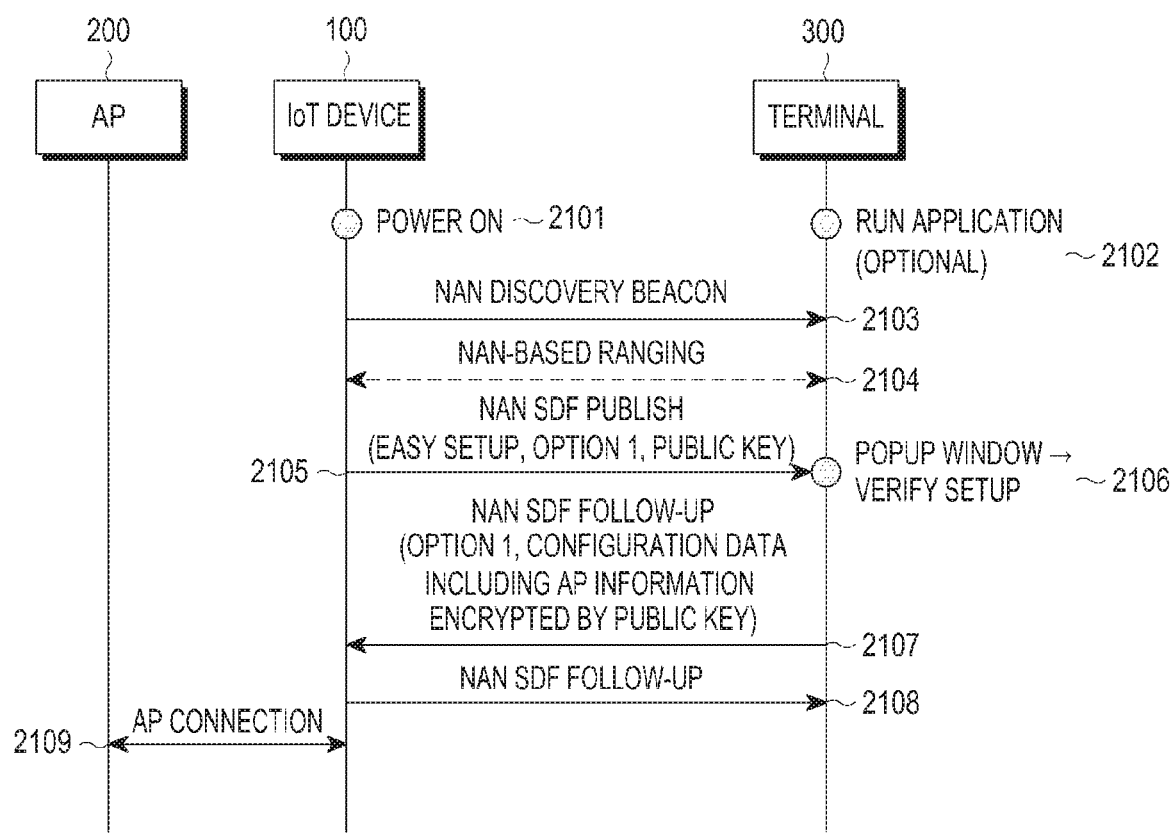
FIG. 21 is a flow diagram of a connectionless security-type easy setup method according to an embodiment of the present disclosure.

FIG. 21 is a flow diagram of a connectionless security-type easy setup method according to an embodiment of the present disclosure.

An easy setup method in a connection-less security scheme is described below in greater detail with reference to FIGS. 19 and 20.

Referring to FIG. 21, an IoT device 100 powers on in step 2101. Optionally, an application for providing a Wi-Fi setup service may be run on a terminal 300 in step 2102. The IoT device 100 sends NAN discovery beacons to recognize ambient terminal(s) in step 2103. In order to perform a "determine-whether-to-exist-in-same-space" operation on the ambient terminal(s), the IoT device 100 performs NAN-based ranging in step 2104. The IoT device 100 sends a NAN SDF publish to a terminal 300 determined to be present in the same space as a result of the ranging in order to notify of an easy setup in step 2105. According to an embodiment of the present disclosure, the NAN SDF publish includes a service name field and a service information field. The service name field indicates the name of a service supported, i.e., an easy setup or relay-based setup, and the service information field includes information about a security scheme which is a service method and security information. The service name field in the NAN SDF publish may indicate an easy setup, and the service information field may include option 1 which is a security scheme and a public key which is security information.

Referring to FIG. 19, where a connection-less security scheme is used, the service information field in the NAN SDF publish may include option 1 1901 as a security scheme and a public key 1911 as security information.

The terminal displays a popup window and receives a setup verification from the user through the popup window in step 2106. The terminal 300 transmits a NAN SDF follow-up to the IoT device 100 in agreement with the NAN SDF publish in step 2107. The NAN SDF follow-up may include configuration data containing AP information encrypted with a public key and option 1.

Referring to FIG. 20, in a connection-less security scheme, a NAN SDF follow-up may include a WLAN attribute 2021 that is of an attribute type that corresponds to the connection-less security scheme and a service set identifier (SSID) 2031 that is an attribute value as per the advertisement.

In other words, the terminal 300 sends, to the IoT device 100, a NAN SDF follow-up containing configuration data as per option 1 which is a security scheme contained in the received NAN SDF publish in step 2105. The IoT device 100 sends a NAN SDF follow-up to the terminal 300 in response to the NAN SDF follow-up sent from the terminal 300 in step 2108. The IoT device 100 connects with a corresponding AP 200 based on the AP information contained in the configuration data sent from the terminal 300.

Figure 22:
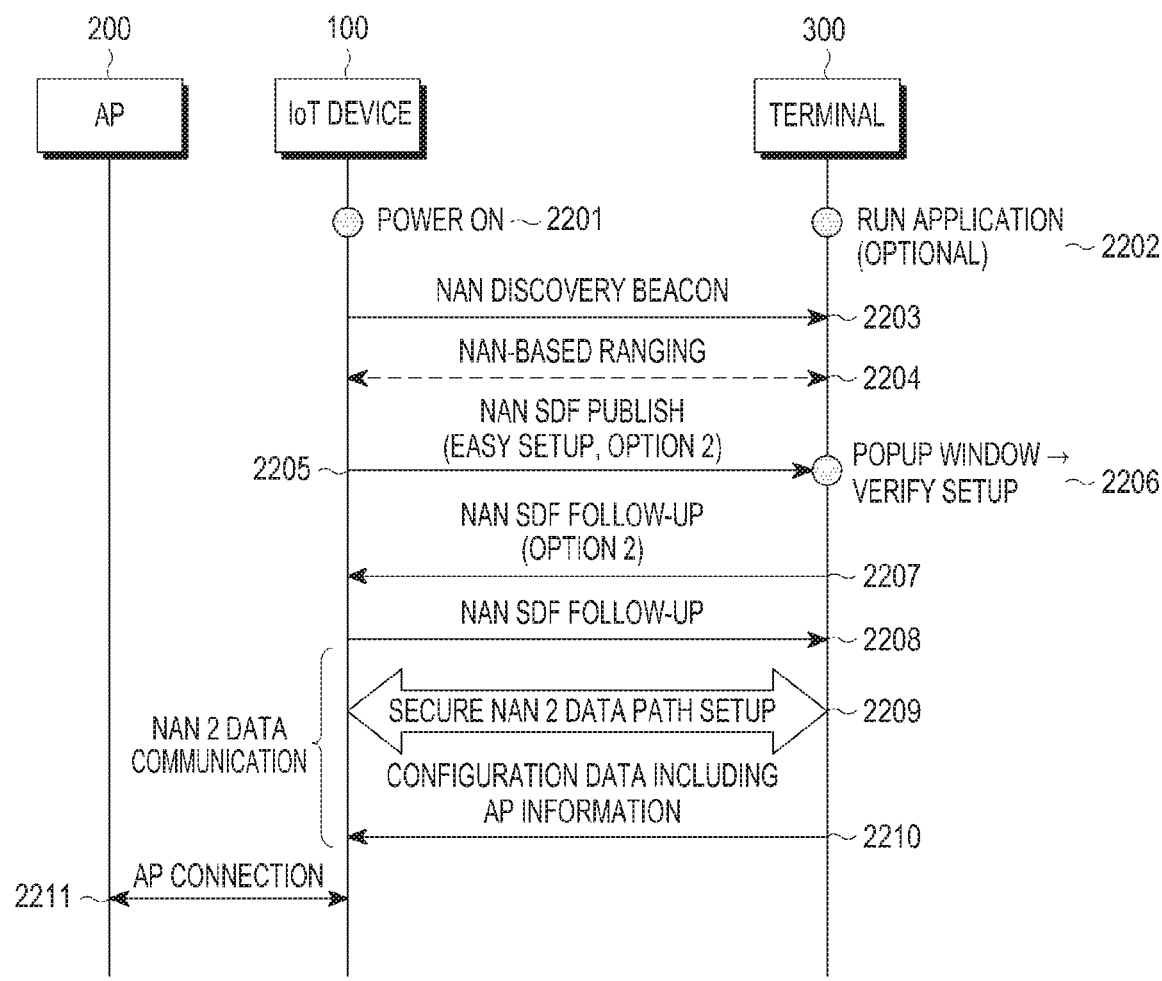
FIG. 22 is a flow diagram of a NAN data path security-type easy setup method according to an embodiment of the present disclosure.

FIG. 22 is a flow diagram of a NAN data path security-type easy setup method according to an embodiment of the present disclosure.

An easy setup method in a NDP security scheme is described below in greater detail with reference to FIGS. 20 and 22.

Referring to FIG. 22, an IoT device 100 powers on in step 2201. Optionally, an application of a terminal 300 may run in step 2202. The IoT device 100 sends NAN discovery beacons to recognize ambient terminals) in step 2203. The IoT device 100 performs NAN-based ranging in order to perform an operation for determining whether a terminal 300 responsive to the NAN discovery beacon is present in the same space in step 2204. The IoT device 100 sends a NAN SDF publish to the terminal 300 in order to notify of the support of an easy setup in step 2205. The service name field in the NAN SDF publish may indicate an easy setup, and the service information field may include option 2 which is a security scheme.

Referring to FIG. 19, in the NDP security scheme, the service information field of the NAN SDF publish may include option 2 1902 as a security scheme. There is no security information 1912 about option 2.

The terminal 300 displays a popup window and receives a setup verification from the user through the popup window in step 2206. The terminal 300 sends a NAN SDF follow-up to the IoT device 100 in agreement with the NAN SDF publish in step 2207. The NAN SDF follow-up may include option 2 which is a security scheme.

Referring to FIG. 20, in the NDP security scheme, the NAN SDF follow-up may include a configurator key 2022 which is of an attribute type corresponding to the NDP security scheme and key information 2032 that is an attribute value as per the attribute type.

The IoT device 100 sends a NAN SDF follow-up to the terminal 300 in response to the NAN SDF follow-up sent from the terminal 300 in step 2208. NAN 2 data communication starts between the terminal 300 and the IoT device 100 in step 2209 and in step 2210. The IoT device 100 initiates a secure NAN 2 data path setup in step 2209. The terminal 300 sends, to the AP 200, configuration data containing AP information in step 2210. The IoT device 100 connects with the AP 200 based on the AP information sent from the terminal 300 in step 2211.

Figure 23:
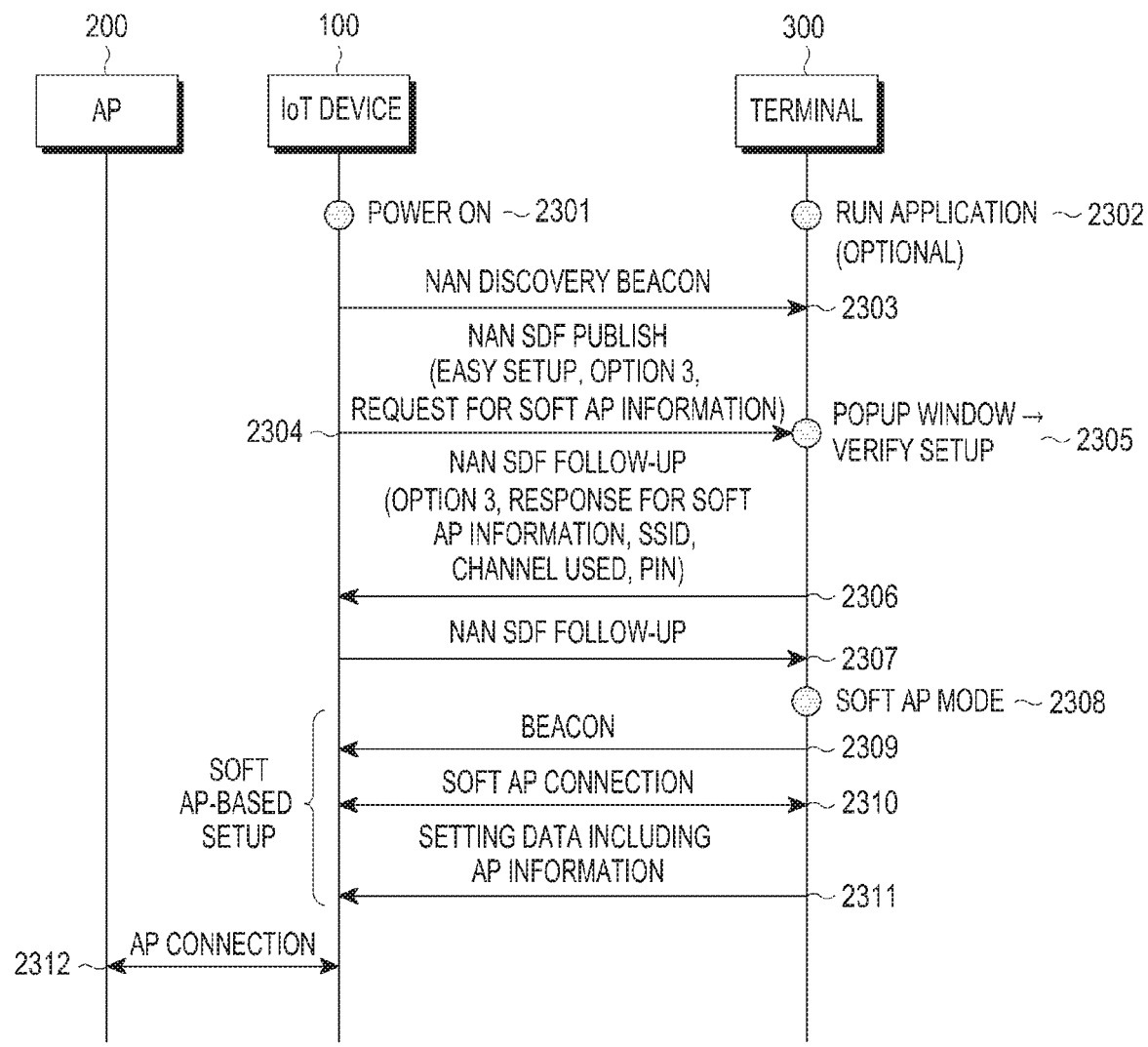
FIG. 23 is a flow diagram of a soft AP security-type easy setup method according to an embodiment of the present disclosure.

FIG. 23 is a flow diagram of a soft AP security-type easy setup method according to an embodiment of the present disclosure.

An easy setup method in a soft AP security scheme is described below in greater detail with reference to FIGS. 19 and 20.

Referring to FIG. 23, an IoT device 100 powers on in step 2301. Optionally, an application of a terminal 300 may run in step 2302. The IoT device 100 sends a NAN discovery beacon to a terminal 300 to recognize the ambient terminal in step 2303. The IoT device 100 sends a NAN SDF publish to the terminal 300 to notify of the support of an easy setup method in step 2304. The service name field of the NAN SDF publish may indicate an easy setup, and the service information field may include a request for soft AP information which is security information and option 3 which is a security scheme.

Referring to FIG. 19, where a soft AP security scheme is used, the service information field in the NAN SDF publish may include option 3 1903 as a security scheme and soft AP information 1913, such as an SSID, operating channel, or PIN, as security information.

The terminal displays a popup window and receives a setup verification from the user through the popup window in step 2305. The terminal 300 transmits a NAN SDF follow-up to the IoT device 100 in agreement with the NAN SDF publish in step 2306. The NAN SDF follow-up may include a response to the soft AP information and option 3.

Referring to FIG. 20, in the soft AP security scheme, the NAN SDF follow-up may include a password 2023 which is of an attribute type corresponding to the soft AP security scheme and a passphrase 2033 that is an attribute value as per the attribute type.

The IoT device 100 sends a NAN SDF follow-up to the terminal 300 in response to the NAN SDF follow-up sent from the terminal 300 in step 2307. The terminal 300 operates as a soft AP in step 2308. The terminal 300 and the IoT device 100 initiate a soft AP-based setup in steps 2309, 2310, and 2311. For example, the terminal 300 sends a beacon to the IoT device 100 in step 2309. The IoT device 100 and the terminal 300 are connected, i.e., a soft AP connection state in step 2310. The terminal 300 sends configuration data containing AP information to the IoT device 100 in step 2311. The IoT device 100 connects to a corresponding AP 200 based on the AP information sent from the terminal 300.

Figure 24:
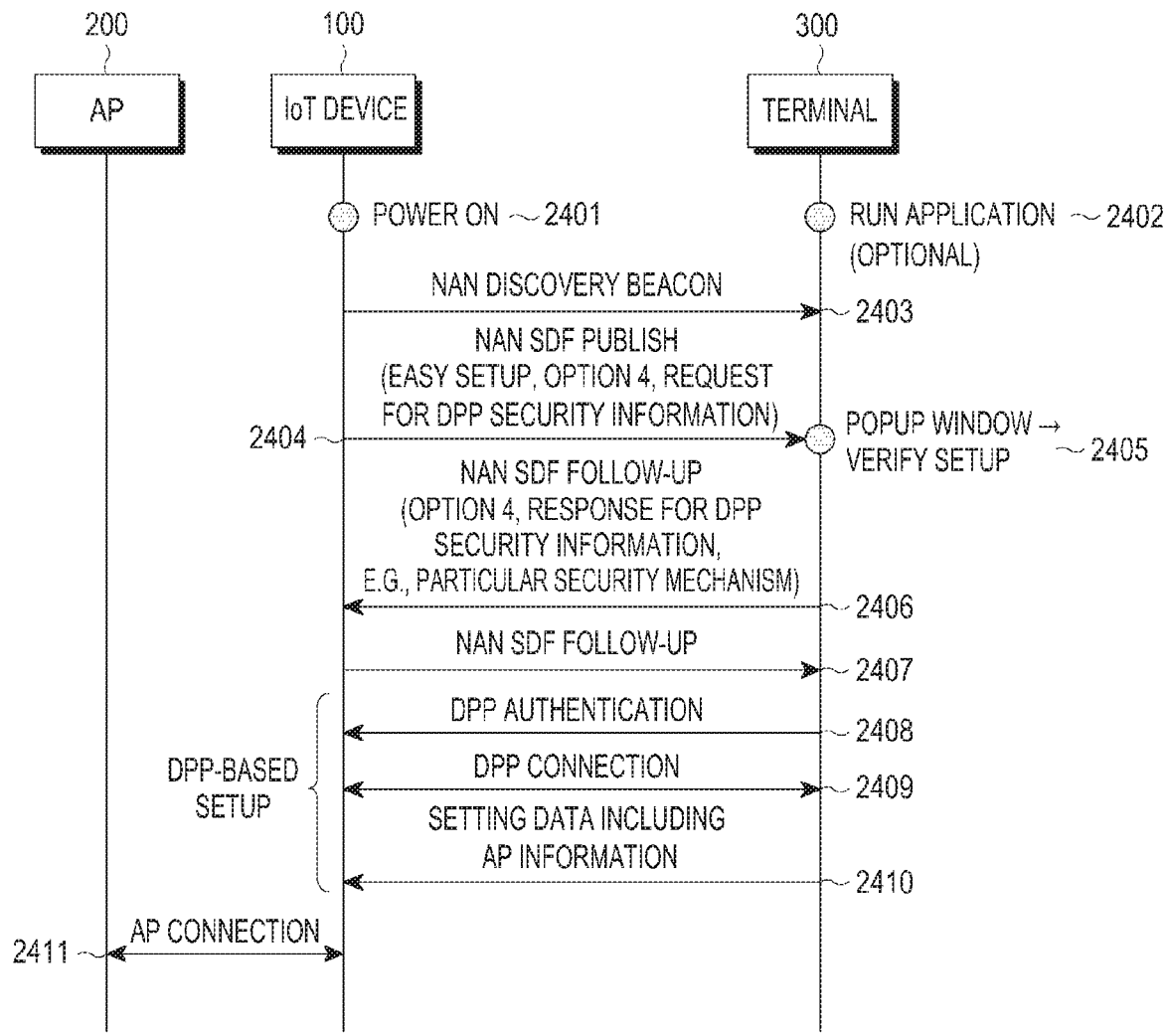
FIG. 24 is a flow diagram of a DPP security-type easy setup method according to an embodiment of the present disclosure.

FIG. 24 is a flow diagram of a DPP security-type easy setup method according to an embodiment of the present disclosure.

An easy setup method in a DPP security scheme is described below in greater detail with reference to FIGS. 19 and 20.

Referring to FIG. 24, an IoT device 100 powers on in step 2401. Optionally, an application for providing a Wi-Fi setup service may be run on a terminal 300 in step 2402. The IoT device 100 sends NAN discovery beacons to recognize ambient terminal(s) in step 2403. The IoT device 100 sends a NAN SDF publish to the terminal 300 in order to notify of an easy setup in step 2404. The service name field in the NAN SDF publish may indicate an easy setup, and the service information field may include a request for DPP security information which is security information and option 4 which is a security scheme.

Referring to FIG. 19, where a DPP security scheme is used, the service information field in the NAN SDF publish may include option 4 1904 as a security scheme and DPP security information 1914, such as an identity key or supported security mechanism, as security information.

The terminal 300 displays a popup window and receives a setup verification from the user through the popup window in step 2405. The terminal 300 sends a NAN SDF follow-up to the IoT device 100 in agreement with the NAN SDF publish in step 2406. The NAN SDF follow-up may send a response to the DPP security information and option 4, e.g., a particular security mechanism.

Referring to FIG. 20, in the DPP security scheme, the NAN SDF follow-up may include an AP MAC address 2024 which is of an attribute type corresponding to the DPP security scheme and a MAC address 2034 that is an attribute value as per the attribute type.

The IoT device 100 sends a NAN SDF follow-up to the terminal 300 in response to the NAN SDF follow-up sent from the terminal 300 in step 2407. The terminal 300 and the IoT device 100 initiate a DPP-based setup in steps 2408, 2409, and 2410. The terminal 300 sends a DPP authentication to the IoT device 100 in step 2408. The terminal 300 sets up a DPP connection with the IoT device 100 in step 2409. The terminal 300 sends configuration data containing AP information about the AP 200 to the IoT device 100 through the connection in step 2410. The IoT device 100 connects with the AP 200 based on the AP information sent from the terminal 300 in step 2411.

In a following embodiment, when the Wi-Fi setup fails in the AP information-based easy setup connection (or association) process after the IoT device receives AP information from the terminal, the IoT device may attempt a Wi-Fi setup through a relay.

Figure 25:
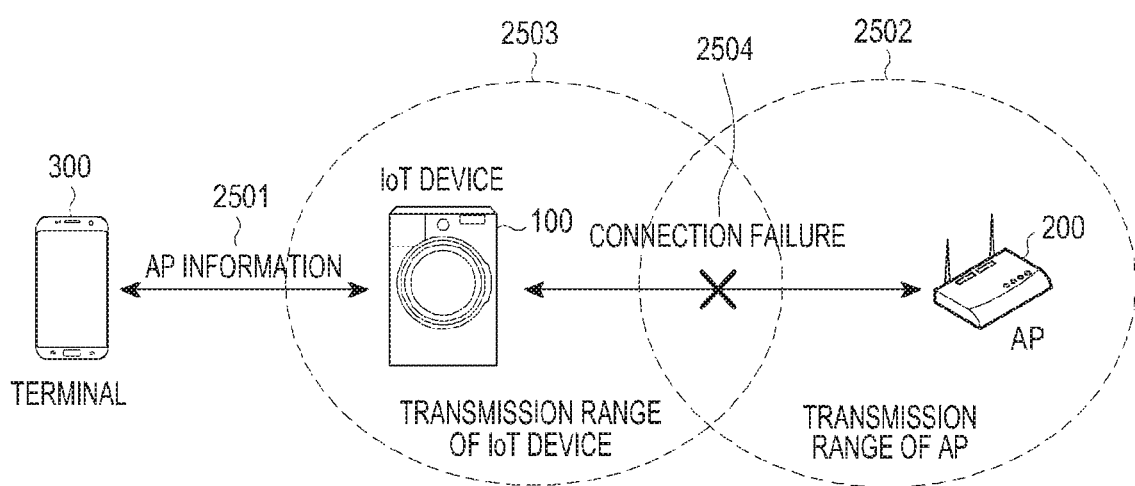
FIG. 25 is an illustration of a situation where a connection fails due to a transmission range between an IoT device and an AP.

FIG. 25 is an illustration of a situation where a connection fails as per a transmission range between an IoT device and an AP.

Referring to FIG. 25, an IoT device 100 obtains AP information 2501 from a terminal 300 and attempts to connect with an AP 200 based on the AP information. Then, where the IoT device 100 is positioned at a distance off a transmission range 2502 of the AP 200, and the AP 200 is positioned at a distance off a transmission range 2503 of the IoT device 100, the connection between the IoT device 100 and the AP 200 may fail 2504.

Where the connection between the IoT device 100 and the AP 200 fails, the user may be requested to separately analyze the reason for the failure to the Wi-Fi setup and install or move an additional AP.

Figure 26:
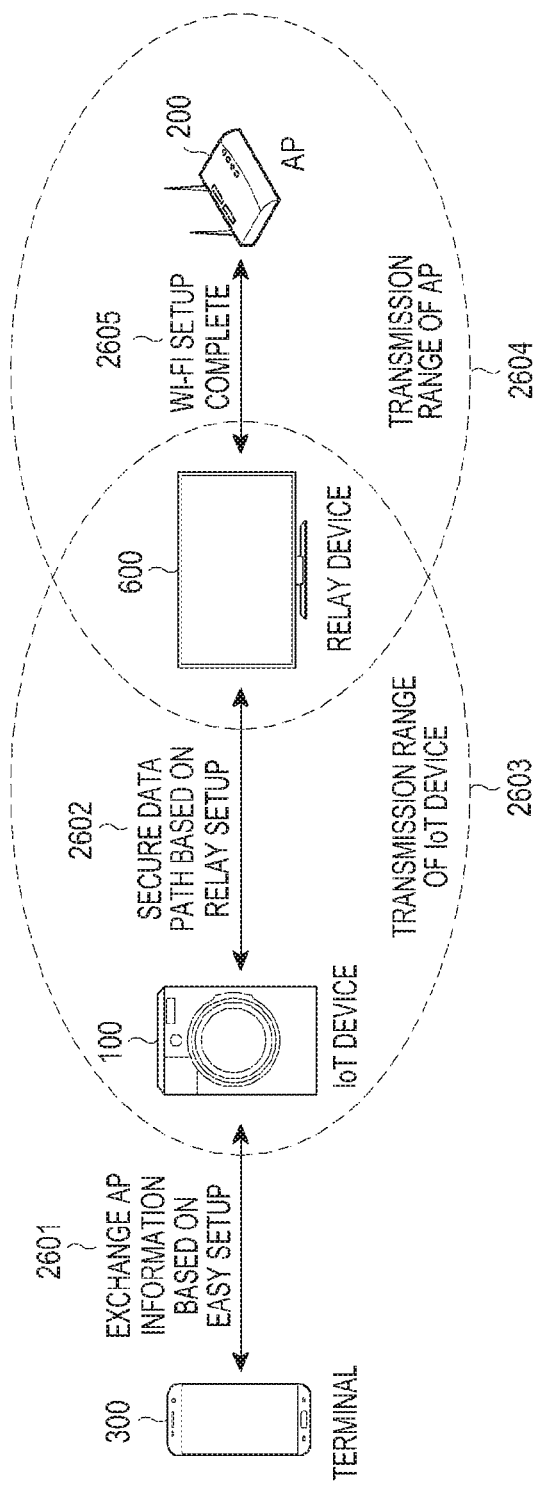
FIG. 26 is an illustration of a relay-based setup according to an embodiment of the present disclosure.

FIG. 26 is an illustration of a relay-based setup according to an embodiment of the present disclosure.

Referring to FIG. 26, an IoT device 100 obtains AP information 2601 for an easy setup from a terminal 300. The IoT device 100 and a relay device 600 may also secure a data path for the relay-based setup 2602. In this case, the relay device 600 is a terminal supportive of the relay-based setup and located within a transmission range 2603 of the IoT device 100 and within a transmission range 2604 of the AR In addition, the relay device 600 is already in a state where the Wi-Fi setup with the AP 200 is complete.

Figure 27:
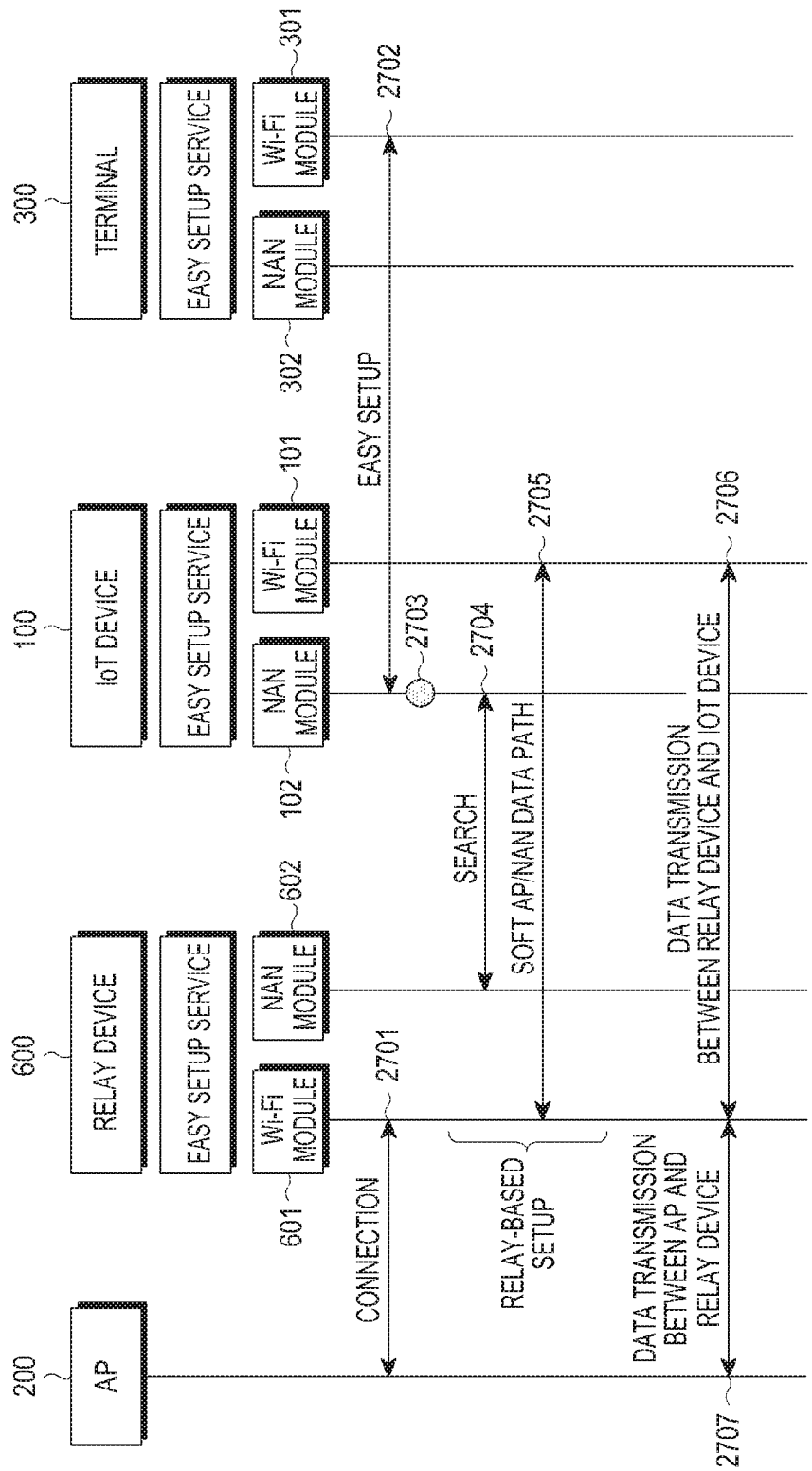
FIG. 27 is a flow diagram of a relay-based setup according to an embodiment of the present disclosure.

FIG. 27 is a flow diagram of relay-based setup according to an embodiment of the present disclosure.

Referring to FIG. 27, an IoT device 100 supports an easy setup. The IoT device 100 includes a Wi-Fi module 101 and a NAN module 102. A terminal 300 supports the easy setup. The terminal 300 includes a Wi-Fi module 301 and a NAN module 302. A relay device 600 supports the easy setup. The terminal 300 includes a Wi-Fi module 601 and a NAN module 602.

The relay device 600 is in a state of being connected with the AP 200 in step 2701. Where the IoT device 100 fails in a Wi-Fi setup in the process of connecting with the AP 200 in the easy setup in step 2702, the following procedure may be carried out to perform a Wi-Fi setup between the relay device 600 and the IoT device 100 in step 2703.

When the relay device 600 and the IoT device 100 initiate a relay-based setup, the NAN module 602 of the relay device 600 and the NAN module 102 of the IoT device 100 perform a discovery process in step 2704. For example, the IoT device 100 defines devices connected to the AP 200 through the AP information received from the terminal 300 in the easy setup process as candidate relay devices and performs a discovery process in step 2704. The IoT device 100 chooses one of the candidate relay devices as the relay device 600 and performs a connection with the relay device 600 for data transmission. In other words, the Wi-Fi module 601 of the relay device 600 and the Wi-Fi module 101 of the IoT device 100 perform a connection process in step 2705 through a soft AP security scheme or NDP security scheme. As the connection process in step 2705 is complete, the Wi-Fi module 601 of the relay device 600 and the Wi-Fi module 101 of the IoT device 100 perform relay device-IoT device data transmission in step 2706. Further, the AP 200 and the Wi-Fi module 601 of the relay device 600 perform AP-relay device data transmission in step 2707. In other words, the relay device 600 may receive data necessary for an easy setup from the IoT device 100 and send the same to the AP 200.

Figure 28:
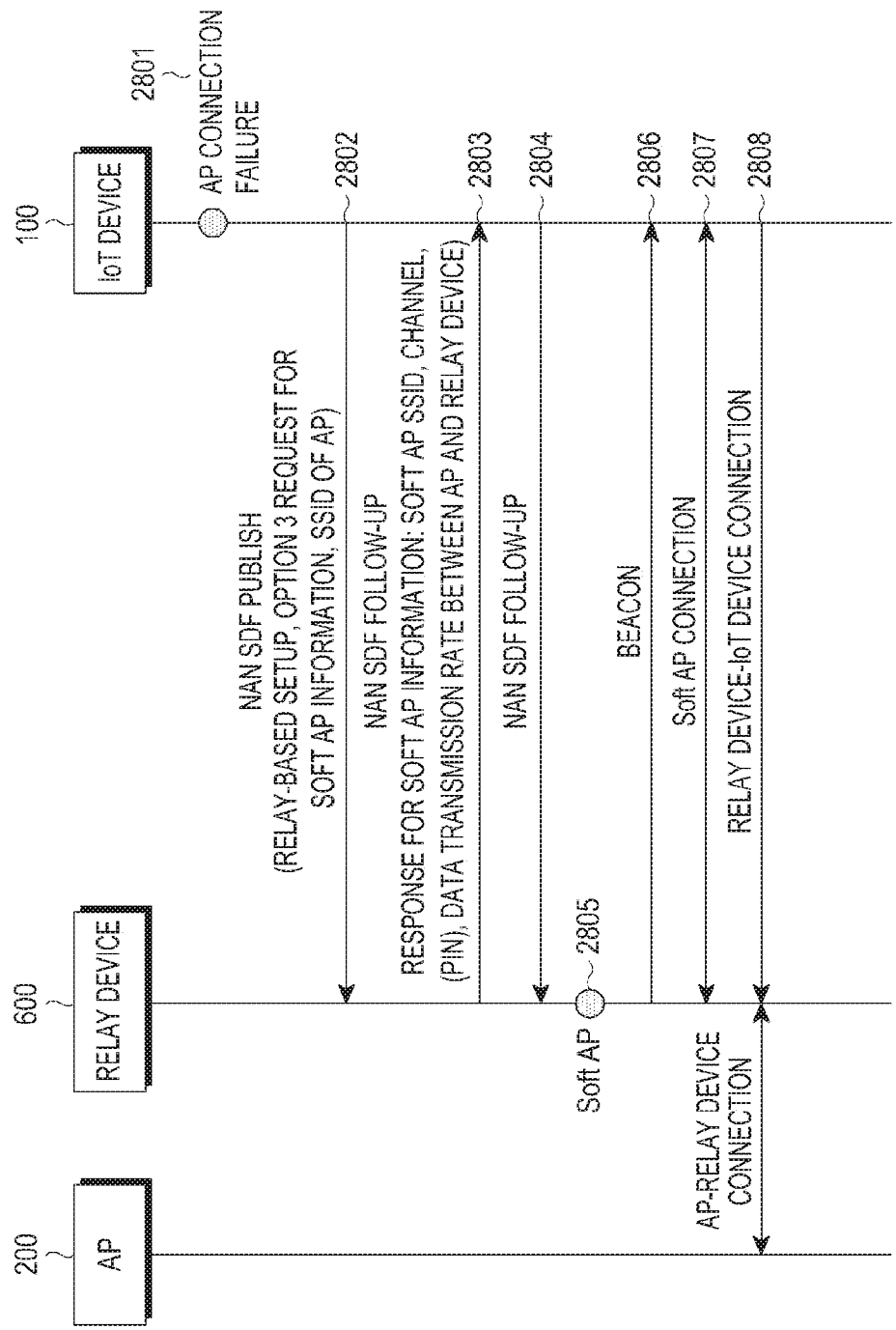
FIG. 28 is a flow diagram of a soft AP security-type relay-based setup according to an embodiment of the present disclosure.

FIG. 28 is a flow diagram of a soft AP security-type relay-based setup according to an embodiment of the present disclosure.

An IoT device 100, after receiving AP information from a terminal, recognizes that the AP 200 is not present within a transmission range through failure of a predetermined number of times of connection attempt. In other words, the IoT device 100 is in a state where the Wi-Fi setup fails in the process of connecting with the AP 200 in the easy setup in step 2801. The IoT device 100 sends a NAN SDF publish to a relay device 600 in step 2802. The service name field of the NAN SDF publish may indicate a relay setup, and the service information field may include option 3, a request for soft AP information, and the SSID of the AP 200. The IoT device 100 may restrict candidate relay devices by including the SSID of the AP 200 in the service information field of the NAN SDF publish.

The relay device 600 sends a NAN SDF follow-up to the IoT device 100 in agreement with the NAN SDF publish in step 2803. The NAN SDF follow-up includes a response to the soft AP information. The response to the soft AP information includes the SSID of the Soft AP and a channel AP-relay device data transmission rate and may include a PIN. As the relay device 600 includes the AP-relay device data transmission rate in the response to the soft AP information, if there are a plurality of candidate relay devices, the IoT device 100 may choose the relay device having the greatest harmonized mean value of the AP-relay device data transmission rate and the relay device-IoT device data transmission rate. Where the harmonized mean values of data transmission rate for the plurality of candidate relay devices are the same, the IoT device 100 may arbitrarily choose one relay device. In response to the NAN SDF follow-up sent from the relay device 600, the IoT device 100 sends a NAN SDF follow-up to the relay device 600 in step 2804. The relay device 600 operates as a soft AP in response to the NAN SDF follow-up in step 2805. Where the relay device 600 operates as a soft AP, the relay device 600 may send configuration data to the IoT device 100. However, the relay device 600 may abstain from sending configuration data to the IoT device 100 by using the same PIN or password as the AP 200. In other words, the IoT device 100 may communicate with the relay device 600 that operates as a soft AP using the PIN or password of the AP 200. The relay device 600, which operates as a soft AP, sends a beacon to the IoT device 100 in step 2806. The relay device 600 and the IoT device 100 are connected in a soft AP mode in step 2807. The relay device 600 and the IoT device 100 are connected in step 2808, and the AP 200 and the relay device 600 are connected in step 2809. Accordingly, the relay device 600 may deliver data necessary for an easy setup between the IoT device 100 and the AP 200.

Figure 29:
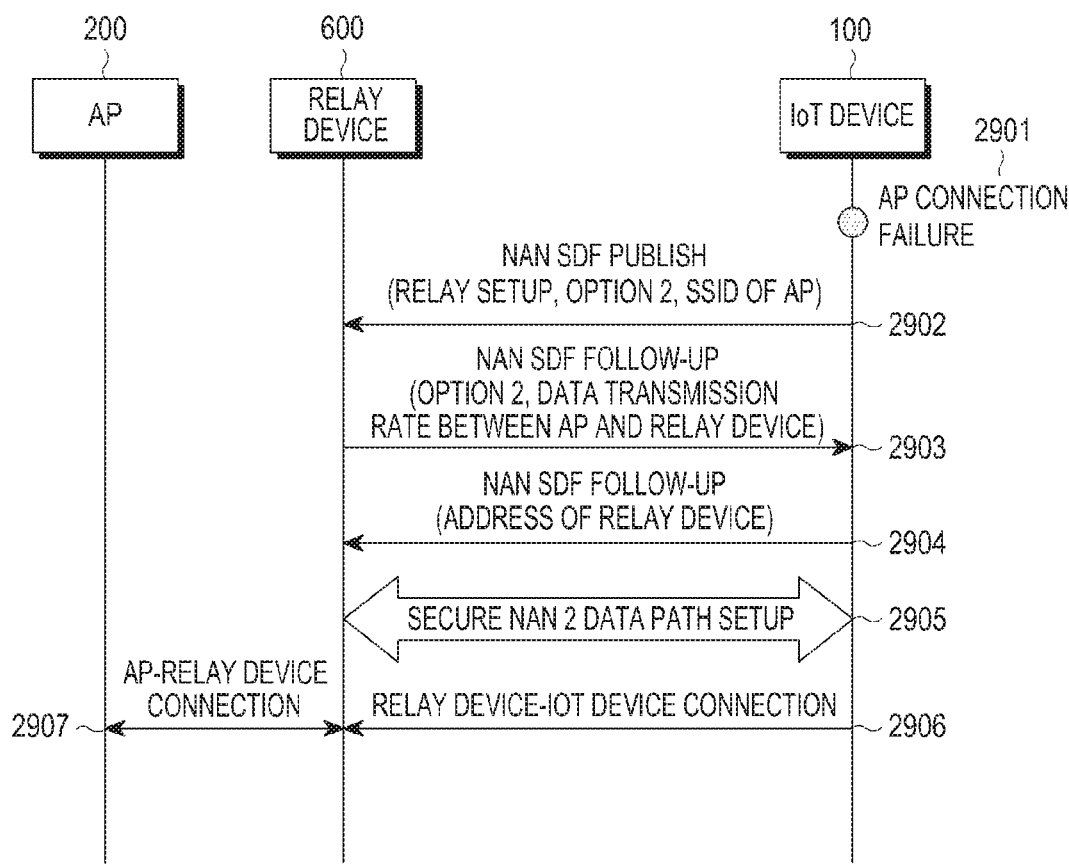
FIG. 29 is a flow diagram of a NAN data path security-type relay-based setup method according to an embodiment of the present disclosure.

FIG. 29 is a flow diagram of a NAN data path security-type relay-based setup method according to an embodiment of the present disclosure.

Referring to FIG. 29, the IoT device 100 is in a state where the Wi-Fi setup fails in the process of connecting with the AP 200 in the easy setup in step 2901. The IoT device 100 sends a NAN SDF publish to a relay device 600 in step 2902. The service name field of the NAN SDF publish may indicate a relay setup, and the service information field may include option 3, a request for soft AP information, and the SSID of the AP 200. The IoT device 100 may restrict candidate relay devices by including the SSID of the AP 200 in the service information field of the NAN SDF publish. The relay device 600 sends a NAN SDF follow-up to the IoT device 100 in agreement with the NAN SDF publish in step 2903. The NAN SDF follow-up may include option 2 and an AP-relay device data transmission rate. The IoT device 100 sends a NAN SDF follow-up to the relay device 600 in response to the NAN SDF follow-up sent from the relay device 600 in step 2904. The IoT device 100 initiates a secure NAN 2 data path setup in step 2905. The relay device 600 and the IoT device 100 are connected in step 2906, and the AP 200 and the relay device 600 are connected in step 2907. Accordingly, the relay device 600 may deliver data necessary for an easy setup between the IoT device 100 and the AP 200.

Figure 30:
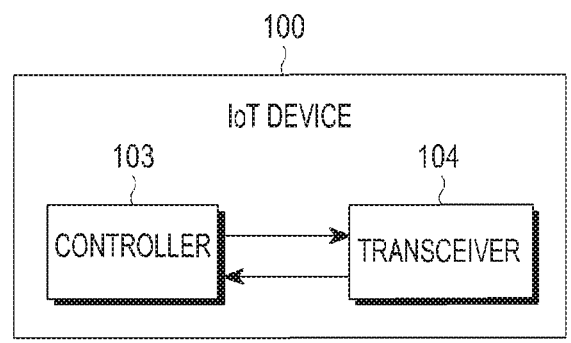
FIG. 30 is a block diagram of an IoT device according to an embodiment of the present disclosure.

FIG. 30 is a block diagram of an IoT device according to an embodiment of the present disclosure. For ease of description, components not directly related to the present disclosure are neither shown nor described.

Referring to FIG. 30, an IoT device 100 includes a controller 103 and a transceiver 104.

The controller 103 recognizes at least one terminal that is present in the same space as the device and attempts to connect with the AP based on AP information.

The transceiver 104 sends a request for connection between the device and an AP to at least one terminal and receives AP information necessary for connection with the AP from the at least one terminal.

Figure 31:
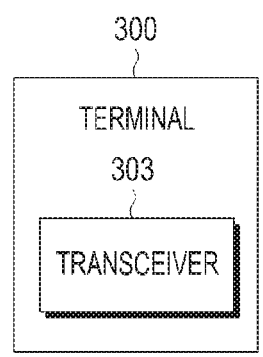
FIG. 31 is a block diagram of a terminal according to an embodiment of the present disclosure.

FIG. 31 is a view illustrating a configuration of a terminal according to an embodiment of the present disclosure. For ease of description, components not directly related to the present disclosure are neither shown nor described.

Referring to FIG. 31, a terminal 300 includes a transceiver 303.

The transceiver 303 receives a request for connection between a device and an AP from the device and sends AP information necessary for connection with the AP to the device corresponding to the request.

Various embodiments of the present disclosure may be implemented in computer readable codes in a non-transitory computer readable recording medium in some aspects. The non-transitory computer readable recording medium is a data storage device that may store data readable by a computer system. Examples of the non-transitory computer readable recording medium may include read only memories (ROMs), random access memories (RAMs), compact disk-read only memories (CD-ROMs), magnetic tapes, floppy disks, optical data storage devices, and carrier waves (such as data transmission over the Internet). The non-transitory computer readable recording medium may be distributed by computer systems over a network, and accordingly, the computer readable codes may be stored and executed in a distributed manner. Functional programs, codes, and code segments to attain various embodiments of the present disclosure may be readily interpreted by skilled programmers in the art to which the present disclosure pertains.

The apparatuses and methods according to embodiments of the present disclosure may be implemented in hardware, software, or a combination of hardware and software. Such software may be recorded in volatile or non-volatile storage devices, such as ROMs, memories, such as RAMs, memory chips, memory devices, or integrated circuit devices, compact disks (CDs), digital versatile discs (DVDs), magnetic disks, magnetic tapes, or other optical or magnetic storage devices while retained in machine (e.g., computer)-readable storage media. The methods according to embodiments of the present disclosure may be implemented by a computer or a portable terminal including a controller and a memory, and the memory may be an exemplary machine-readable storage medium that may properly retain program(s) containing instructions for implementing the embodiments of the present disclosure.

Accordingly, the present disclosure encompasses a program containing codes for implementing the device or method set forth in the claims of this disclosure and a machine (e.g., computer)-readable storage medium storing the program. The program may be electronically transferred via any media such as communication signals transmitted through a wired or wireless connection and the present disclosure properly includes the equivalents thereof.

The apparatuses according to embodiments of the present disclosure may receive the program from a program providing device wiredly or wirelessly connected thereto and store the same. The program providing apparatus may include a memory for storing a program including instructions enabling a program processing apparatus to perform a method according to an embodiment of the present disclosure and data necessary for a method according to an embodiment of the present disclosure, a communication unit for performing wired or wireless communication with a graphic processing apparatus, and a controller transmitting the program to the graphic processing apparatus automatically or as requested by the graphic processing apparatus.

The embodiments herein are provided merely for better understanding of the present disclosure, and the present disclosure is not intended to be limited thereto or thereby. The embodiments set forth herein are merely examples, and it will be apparent to one of ordinary skill in the art that various changes may be made thereto without departing from the scope of the present disclosure as defined by the appended claims and their equivalents.

What is claimed is:

1. A method for setup of wireless communication by a device, the method comprising:
   broadcasting a neighbor awareness networking (NAN) synchronization beacon;
   broadcasting a NAN publish service discovery frame (SDF) including security information for a connection between the device and an access point (AP);
   receiving, from a terminal, a NAN follow-up SDF including AP information for the connection, the AP information includes an address of the AP; and
   establishing the connection based on the AP information received in the NAN follow-up SDF,
   wherein the device is synchronized with the terminal based on the NAN synchronization beacon, and
   wherein the AP information is encrypted by the security information.

2. The method of claim 1, further comprising:
   identifying whether a location of the terminal being in a space which is included a location of the device, wherein whether the location of the terminal being in the space is identified by, measuring a distance between the device and the terminal and a signal strength of the terminal; and determining that the location of the terminal being in the space which is included the location of the device, in case that the distance between the device and the terminal is less than a predetermined first threshold and the signal strength of the terminal is greater than a predetermined second threshold.

3. The method of claim 2, wherein the distance between and the device and the terminal is calculated based on a round trip time between the device and the terminal.

4. The method of claim 1, wherein the NAN SDF further includes a security scheme, and
wherein the security scheme is at least one of a connection-less security scheme, a NAN data path (NDP) security scheme, a software enabled access point (soft AP) security scheme, and a device provisioning protocol (DPP) security scheme.

5. The method of claim 1, further comprising:
in case that the connection fails, choosing other device connected to the AP as a relay device;
establishing a connection with the relay device; and
establishing a connection with the AP through the relay device.

6. The method of claim 5, wherein the establishing the connection I with the relay device is based on one of a soft AP security scheme and a NDP security scheme.

7. A device for setup of wireless communication, comprising:
a transceiver coupled to at least one controller; and
the at least one controller configured to:
broadcast a neighbor awareness networking (NAN) synchronization beacon, broadcast a NAN publish service discovery frame (SDF) including security information for a connection between the device and an access point (AP);
receive, from a terminal, a NAN follow-up SDF including AP information for the connection, the AP information includes an address of the AP; and establish the connection based on the AP information received in the follow-up SDF, wherein the terminal is synchronized with the device based on the NAN synchronization beacon, and
wherein the AP information is encrypted by the security information.

8. The device of claim 7, wherein the at least one controller is further configured to:
identify whether a location of the terminal being in a space which is included a location of the device,
wherein whether the location of the terminal being in the space is identified by,
measure a distance between the device and the terminal and a signal strength of the terminal; and
determine that the location of the terminal being in the space which is included the location of the device, in case that the distance between the device and the terminal is less than a predetermined first threshold and the signal strength of the terminal is greater than a predetermined second threshold.

9. The device of claim 8, wherein the at least one controller is further configured to calculate the distance between the device and the terminal based on a round trip time between the device and the terminal.

10. The device of claim 7, wherein the NAN SDF further includes a security scheme, and
wherein the security scheme is at least one of a connection-less security scheme, a NAN data path (NDP) security scheme, a software enabled access point (soft AP) security scheme, and a device provisioning protocol (DPP) security scheme.

11. The device of claim 7, wherein in case that the connection to the AP fails, the at least one controller is further configured to choose other device connected to the AP as a relay device, establish a connection with the relay device, and establish a connection with the AP through the relay device.

12. The device of claim 11, wherein the at least one controller is further configured to use one of a software enabled access point (soft AP) security scheme and a NDP security scheme.

* * * * *